United States Patent
Tsuda

(10) Patent No.: US 7,203,673 B2
(45) Date of Patent: Apr. 10, 2007

(54) DOCUMENT COLLECTION APPARATUS AND METHOD FOR SPECIFIC USE, AND STORAGE MEDIUM STORING PROGRAM USED TO DIRECT COMPUTER TO COLLECT DOCUMENTS

(75) Inventor: Hiroshi Tsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 09/880,070

(22) Filed: Jun. 14, 2001

(65) Prior Publication Data

US 2002/0113818 A1 Aug. 22, 2002

(30) Foreign Application Priority Data

Dec. 27, 2000 (JP) ............................. 2000-397966

(51) Int. Cl.
*G06F 17/30* (2006.01)

(52) U.S. Cl. ...................................................... 707/3

(58) Field of Classification Search .................... 707/3, 707/5, 2, 101, 1, 6, 10, 200; 705/1; 709/224
See application file for complete search history.

(56) References Cited

U.S. PATENT DOCUMENTS

| | | | | |
|---|---|---|---|---|
| 6,078,913 | A * | 6/2000 | Aoki et al. | 707/2 |
| 6,212,517 | B1 * | 4/2001 | Sato et al. | 707/5 |
| 6,269,368 | B1 * | 7/2001 | Diamond | 707/6 |
| 6,327,590 | B1 * | 12/2001 | Chidlovskii et al. | 707/5 |
| 6,434,556 | B1 * | 8/2002 | Levin et al. | 707/5 |
| 6,675,170 | B1 * | 1/2004 | Flake | 707/101 |
| 2002/0065671 | A1 * | 5/2002 | Goerz et al. | 705/1 |

FOREIGN PATENT DOCUMENTS

| | | |
|---|---|---|
| JP | A-9-218876 | 8/1997 |
| JP | A-9-311802 | 12/1997 |
| JP | A-10-105572 | 4/1998 |
| JP | A-10-260979 | 9/1998 |
| JP | A-2000-90111 | 3/2000 |

OTHER PUBLICATIONS

Soumen Chakrabarti et al., Focused Crawling : A New Approach to Topic-Specific Web Resource Discovery http://www8.org/w8-papers/ In WWW8.
Junghoo Cho et al., Efficient Crawling Through URL Ordering. In WWW7 Conference.

* cited by examiner

*Primary Examiner*—Etienne P. LeRoux
(74) *Attorney, Agent, or Firm*—Staas & Halsey LLP

(57) ABSTRACT

A document collection apparatus collects a document for a community from a network. Before starting the collection, an initial document group is given as a starting point of the collection. A reference extraction unit extracts a reference from the initial document group. A next prospect determination unit determines a prospect which is a prospective document to be collected next. A document collection unit collects the prospect to be collected next, and adds it to the collected documents. The document collection unit first collects documents evenly from inside the community in the network, and then the next prospect determination unit determines the prospect to be collected next from inside and outside the community.

20 Claims, 23 Drawing Sheets

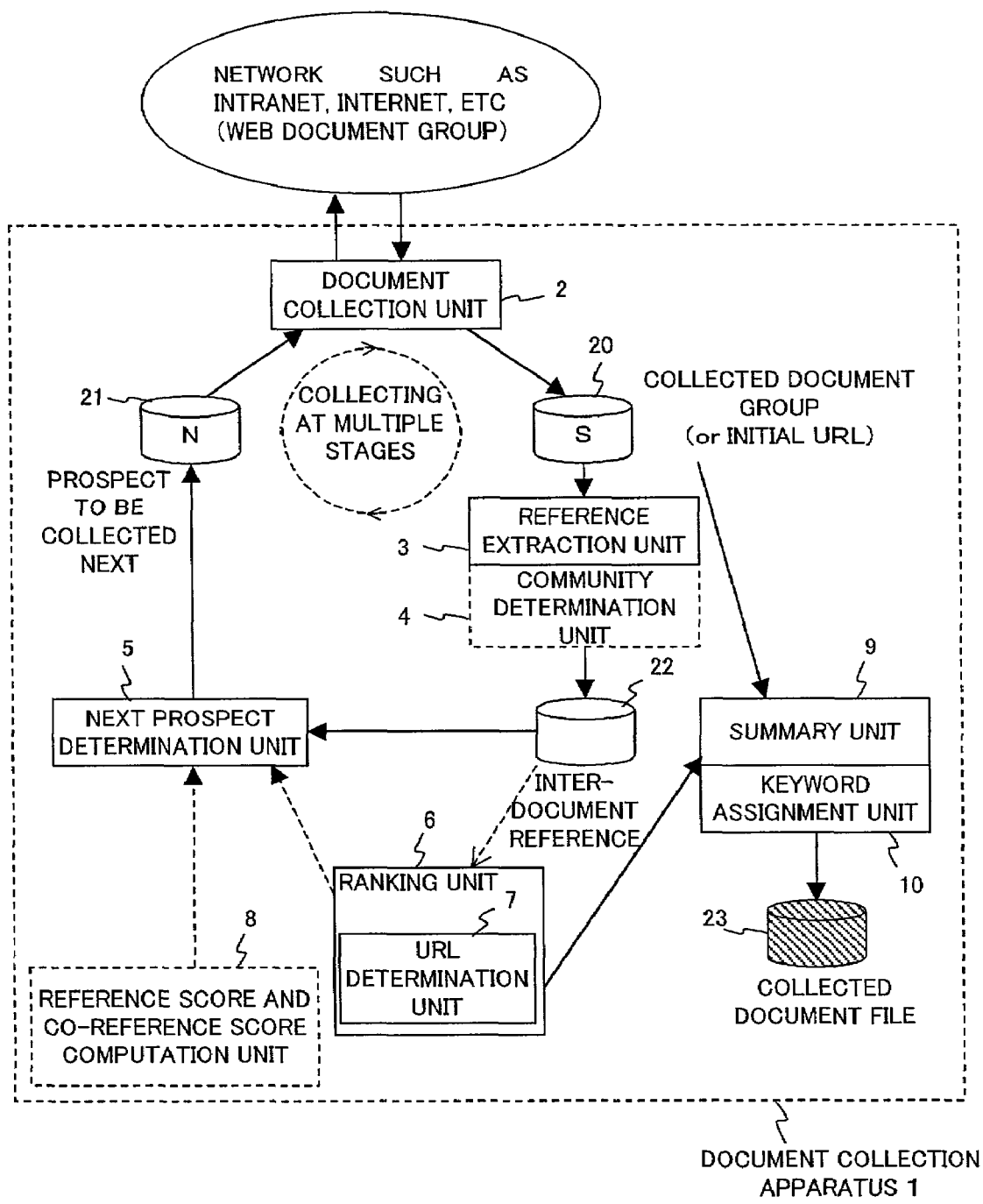
F I G. 1

URL TABLE 120

| DOCUMENT ID | URL | ACCUMULATE FLAG | COMMUNITY FLAG | SIGNIFICANCE LEVEL |
|---|---|---|---|---|
| doc1 | http://www.abc.com/ | 1 | 1 | ..... |
| doc2 | http://www.klm.com/ | 1 | 0 | ..... |
| ... | ..... | ... | ... | ... |

FIG. 3

REFERENCE TABLE 121

| REFERRING DOCUMENT ID | REFERENCED DOCUMENT $ID_1$ (INSIDE COMMUNITY) | REFERENCED DOCUMENT $ID_2$ (OUTSIDE COMMUNITY) |
|---|---|---|
| doc1 | doc2, doc3, doc4 | doc5, doc6, doc7 |
| doc2 | doc4, doc8 | doc9, doc10 |
| ... | ... | ... |

F I G. 4

REFERENCING EXPRESSION TABLE 122

| EXPRESSION ID (w) | EXPRESSION CHARACTER STRING | FREQUENCY (DF(W)) | NECESSITY/ NON-NECESSITY FLAG |
|---|---|---|---|
| rw1 | ABC COMPANY | 24 | 1 |
| rw2 | RETURN TO TOP | 28305 | 0 |
| ... | ... | ... | ... |

FIG. 5

COLLECTED DOCUMENT FILE 123

| EXPRESSION ID(w) / DOCUMENT ID(d) | rw1 | rw2 | ... | rwj | ... | rwm |
|---|---|---|---|---|---|---|
| doc1 | 19 | 0 | | | | |
| doc2 | 0 | 2 | ... | | ... | |
| ... | | | | ... | | |
| doci | | | | TF(doci,rwj) | | ... |
| ... | | | | | | |
| docn | ... | ... | | ... | | ... |

FIG. 6

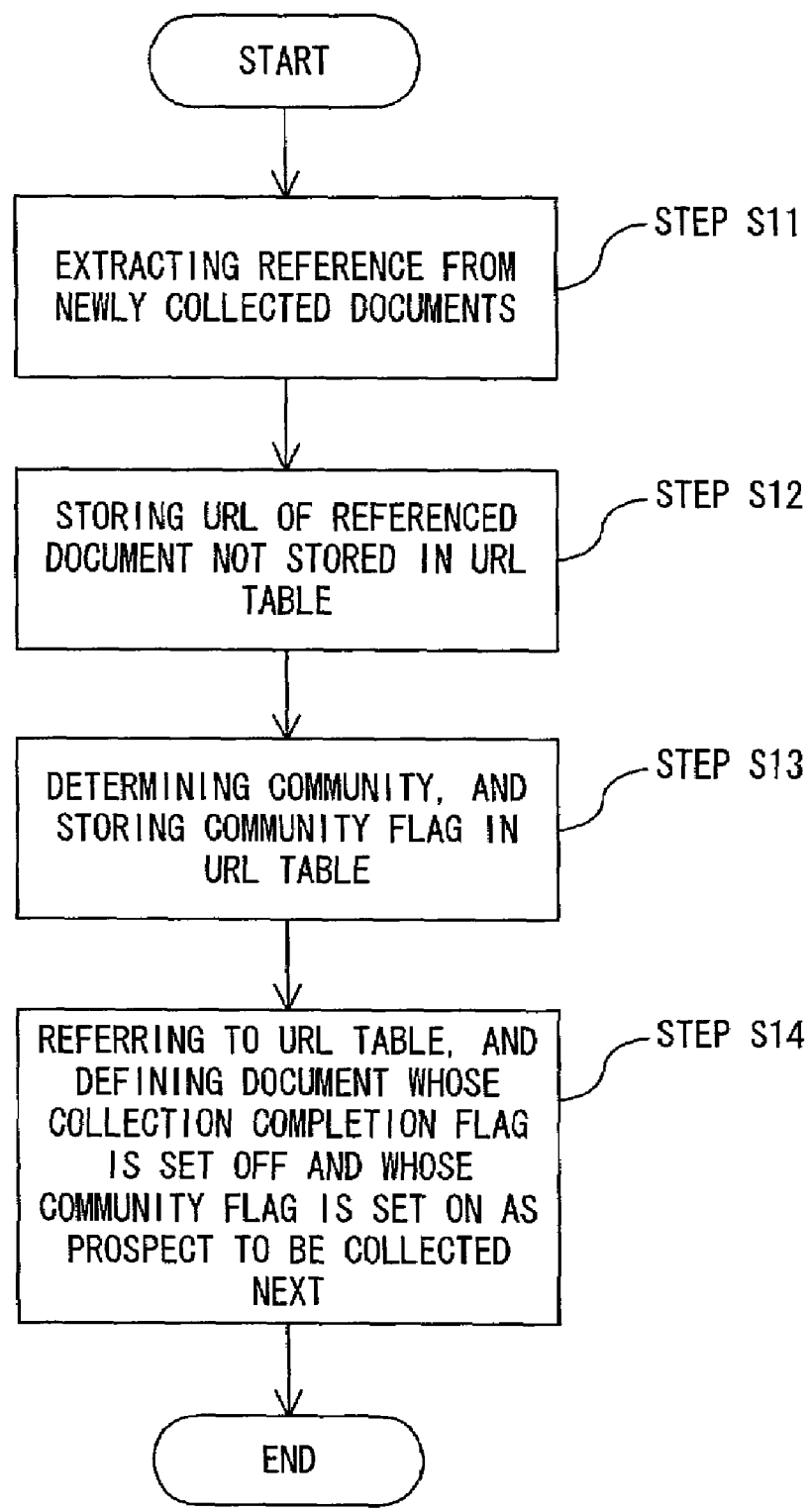
F I G. 8

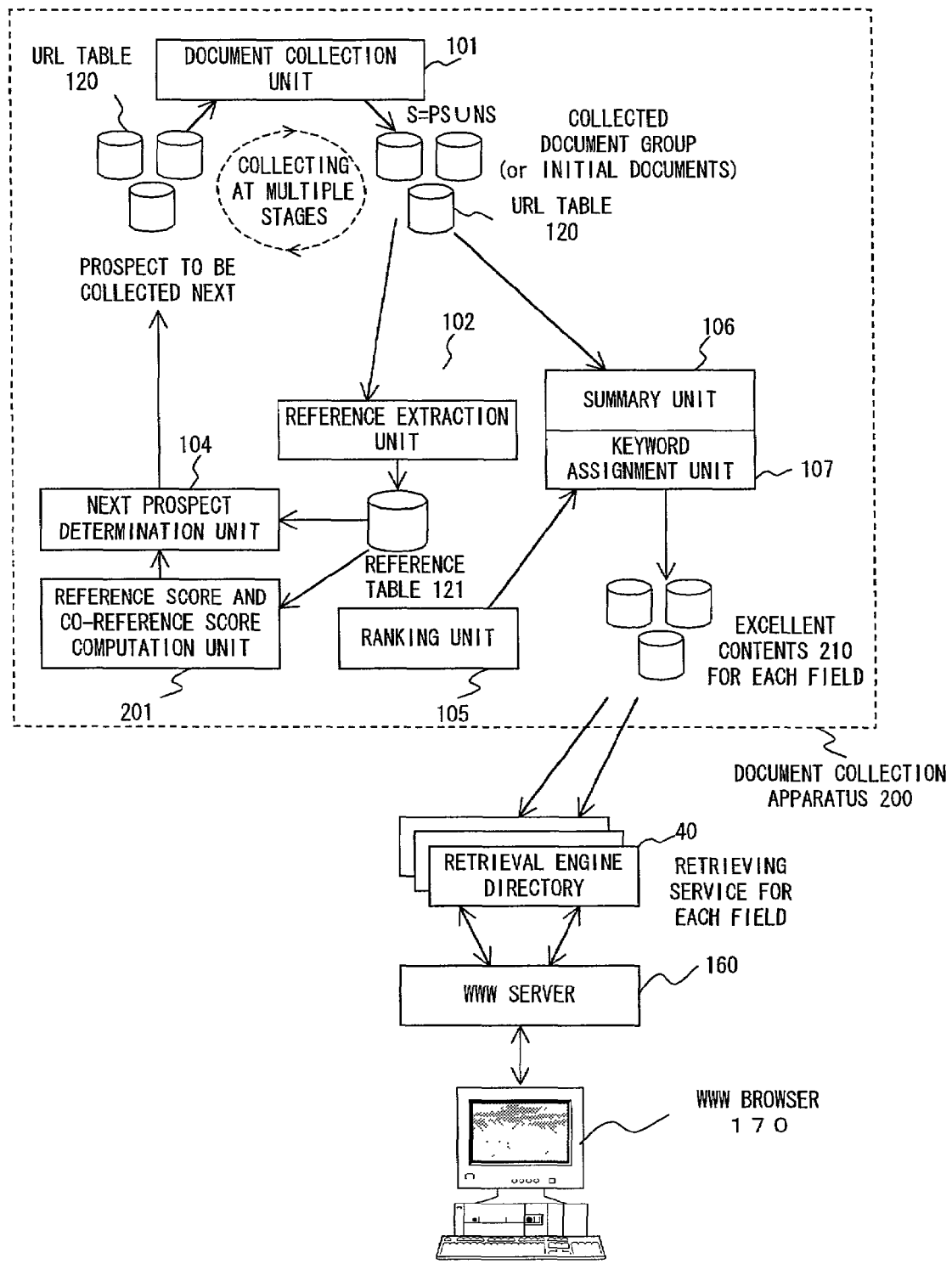
F I G. 1 3

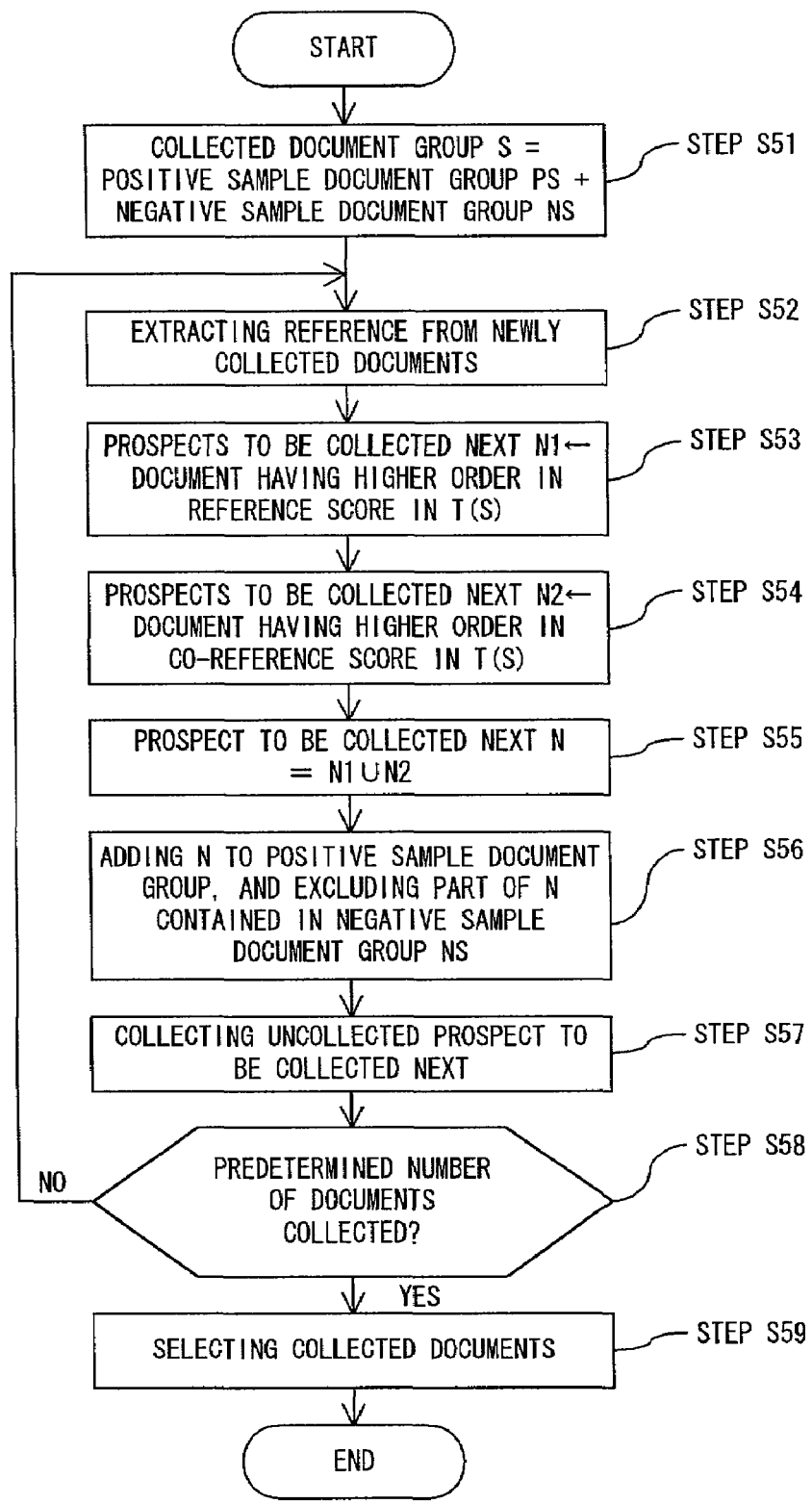
F I G. 1 6

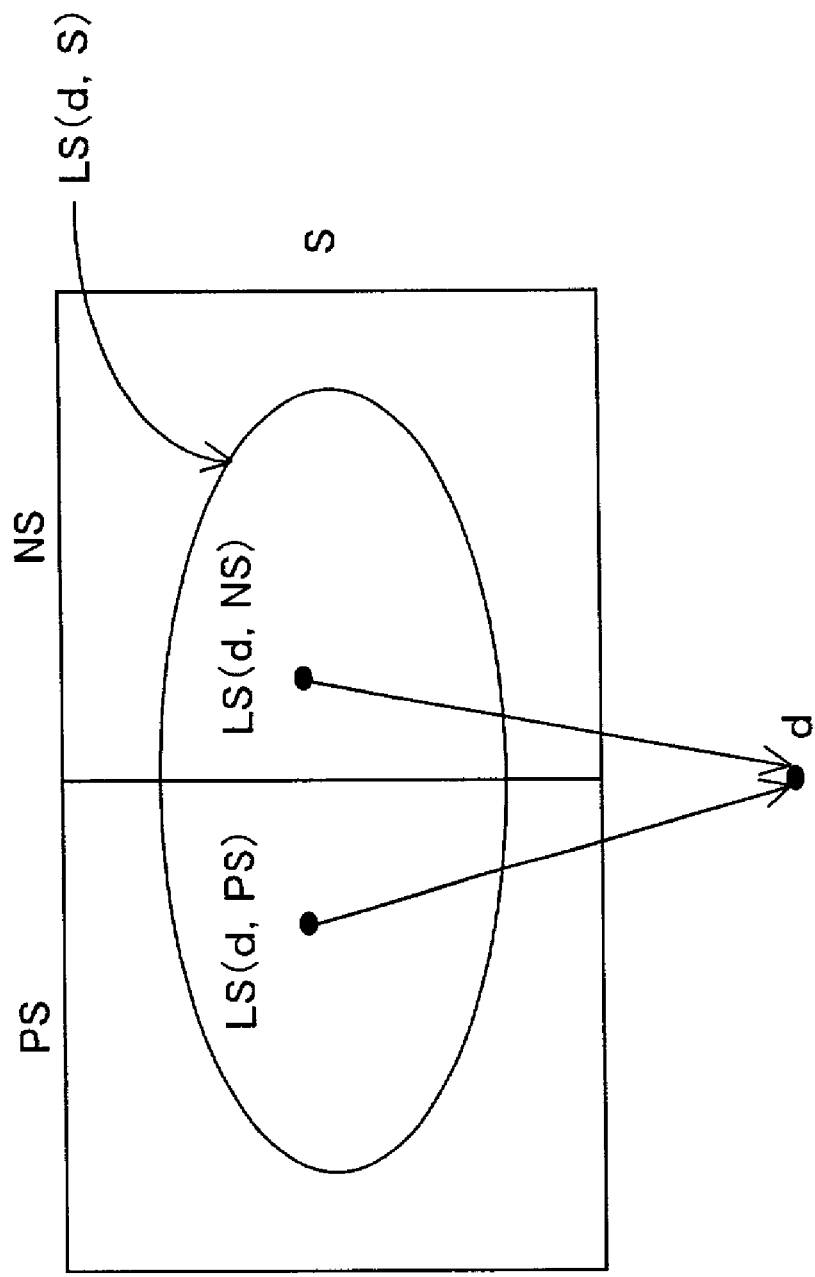
F I G. 17

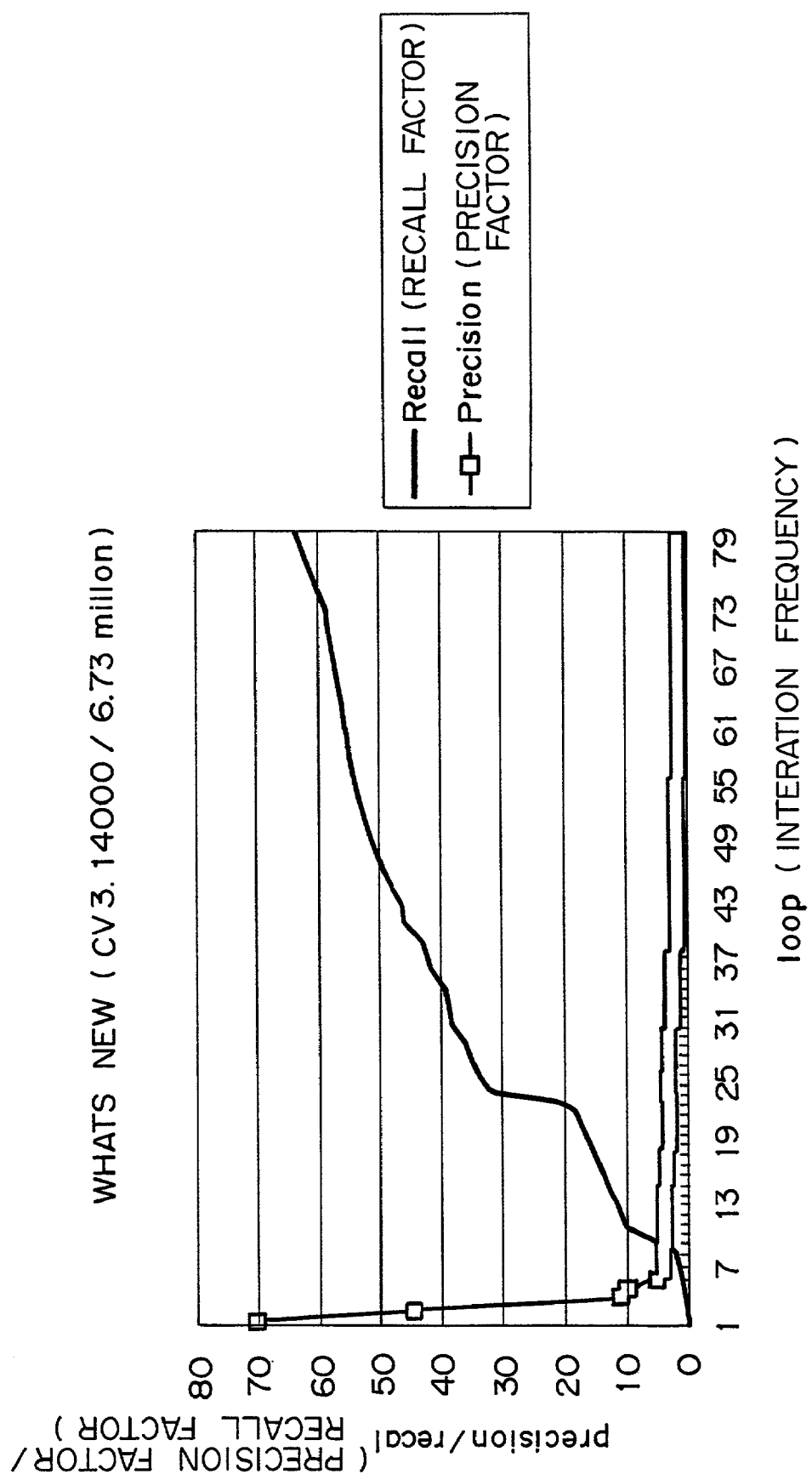
F I G. 21

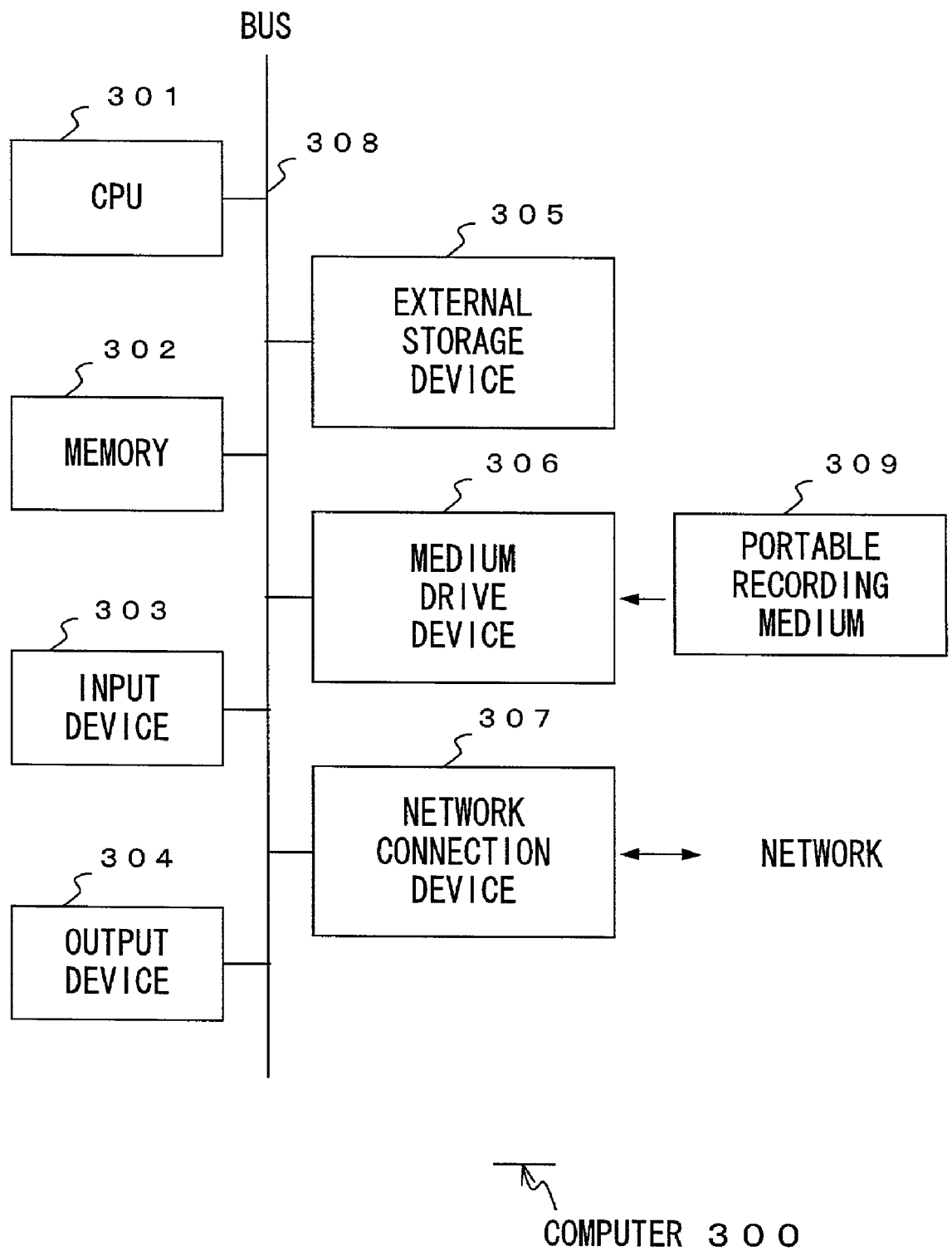
F I G. 22

DOCUMENT COLLECTION APPARATUS AND METHOD FOR SPECIFIC USE, AND STORAGE MEDIUM STORING PROGRAM USED TO DIRECT COMPUTER TO COLLECT DOCUMENTS

BACKGROUND OF THE INVENTION

1. Field of the Invention

The present invention relates to the collection of documents from a network, and more specifically to a document collection apparatus for efficiently collecting documents for each specific use.

2. Description of the Related Art

A retrieval engine for a document processed through a network such as Intranet, WWW, etc. is realized by a document collection apparatus (robot, spider or crawler) for collecting documents from a network, and a retrieval engine for generating a keyword index for collected documents.

The document collection apparatus repeats processes of starting collecting documents based on a given URL (Uniform Resource Locator) group (a URL group which is a starting point from which the collection starts), collecting an uncollected document referenced based on the information about the reference among documents, for example, an anchor, a hyperlink, etc. as a prospect to be collected next, etc. for a predetermined number of times. Thus, a document collection crawler periodically collects a document in a range from several tens of millions of URLs to several hundreds of millions of URLs. A URL refers to a description system of specifying a method of locating the position of information processed through a network.

Recently, a rapidly increasing number of documents exist in through networks, and it is announced as a survey result by Inktomi Company, etc. in January, 2000 that the number of unique documents in the Internet has reached one billion. In July, 2000, it is announced as a survey result by Cyveillance Company in the U.S. that the size of Internet is about 2.1 billion documents, and is estimated to double in 2001.

If documents are collected from among a billion URLs, it will take three years to completely collect the documents even if a million URLs are collected a day (about 10 URLs=40 Kbytes per second). Then, the information in the documents collected on early days becomes obsolete when the documents are completely collected. Therefore, an intellectual document collection apparatus for efficiently collecting only significant information for each use has long been demanded.

Document collection apparatuses for collecting documents by priority for a specified use are listed below.

For example, the invention disclosed by Japanese Patent Publication No. 9-311802 collects new information by priority.

Documents that are considered to be similar in contents are collected based on the following concepts.

a) The scope of the collection is limited by the number of hierarchical levels.

For example, like the invention disclosed by Japanese Patent Publication No. 9-218876, cross-referenced documents are considered to be similar in contents, but they have no semantic relation when they are different in hierarchical level. Therefore, document are collected with the collection scope limited by the number of hierarchical levels.

b) Only documents semantically similar to one another are collected.

For example, as the invention disclosed by Japanese Patent Publication No. 10-105572, the semantic similarity is computed by making a matching check on the contents of document, and only semantically similar documents are collected from among the referenced documents.

c) Only documents having appropriate character strings in referenced documents are collected.

For example, like the inventions disclosed by Japanese Patent Publication No. 10-260979 and No. 2000-9011, based on the referencing expression in a referenced document, for example, the contents of an anchor tag in the HTML, it is determined whether or not the document referenced by the referencing expression is to be collected next.

Generally, more popular documents are collected by priority.

A more frequently referenced document, that is, a document referenced by a large number of documents, is considered to be popular. By collecting documents in order from the most frequently referenced document in the collected document group, popular documents can be collected by priority.

However, the concepts of the above mentioned conventional technology are insufficient to collect documents requested on a portal site of a community such as an enterprise. For example, the portal site in an enterprise, that is, the requirements of a corporation portal include the following conditions.

A large number of documents generated inside and outside a company in real time are automatically collected.

A semantic analysis and categorization are automatically performed.

Documents are collected, and a categorization result is fed to an appropriate position (depending on a user) on the screen.

In collecting documents, an enormously large number of documents inside and outside the company are not collected at random, but are necessarily collected by selecting documents from the viewpoint of the relation to a job from inside documents. A viewpoint of the relation to a job is different from having a specific semantic contents, or having significance. For example, in an Intranet community of an enterprise of a certain scale, the contents of documents are semantically diversified. In addition, outside (for example, Internet) documents, for example, the information about hobbies is popular, but is not always significant to a corporate portal.

However, the conventional concept in collecting documents, for example, obtaining latest information by priority, obtaining information in a specified field by priority, and obtaining popular information by priority has the problem that, relating to the information about hobbies, for example, normally significant documents but not significant to the community can be collected.

In addition, for example, when documents are collected in a method of collecting only semantically similar documents of the above mentioned conventional technology, each concept has the following problems.

Simply limiting the number of hierarchical levels requires a simple process, but does not guarantee that semantically similar documents are collected by priority, or important documents are collected without fail.

In the system of checking the contents of documents and determining whether or not they are semantically similar to one another, a keyword is retrieved by analyzing the text in a document normally in a natural language process, and an analysis is done based on the similarity of the retrieved keyword. Therefore, it takes a long time to perform the process. Actually, only about 100 documents can be processed. Therefore, processing several billions of documents one by one cannot be practically completed. Assuming that the process can be completed, the precision can be 70% through 80%. Since the process largely depends on the type of language, it is necessary to have a determination tool for each language.

Even when it is determined whether or not documents are to be collected based on the referencing expression, a character string used in the referencing expression often contains fixed words and phrases (familiar expressions) such as 'home page', 'return to top', 'click here', etc., and does not always indicate the semantic contents of a referenced document.

SUMMARY OF THE INVENTION

The present invention aims at quickly collecting documents for a specified purpose with high precision independent of a language.

The present invention is based on the apparatus or the method for collecting documents from a network. The apparatus according to each embodiment of the present invention, that is, a document collection apparatus for collecting a document through a network, includes a next prospect determination unit for determining a prospect to be collected next which is a prospective document to be collected next based on the reference in a collected document group; and a document collection unit for collecting the prospect to be collected next through the network, and adding the collected prospect to the collected document group. With the configuration, the apparatus repeatedly determines a prospect to be collected next using the next prospect determination unit, and collects documents using the document collection unit until the number of the documents in the collected document group is equal to or larger than a predetermined value.

The above mentioned apparatus can be configured as a document collection apparatus for a community for collecting useful documents for the community in a network. To attain this, with the above mentioned configuration, after the document collection unit has collected documents evenly from the community in the network, the next prospect determination unit can determine a prospect to be collected next from the documents inside and outside the community based on the reference in the collected document group. Before collecting documents inside and outside the community, documents are evenly collected from the community, thereby obtaining the information about the documents in various fields required in the community. Using the obtained reference in a document group relating to the various fields, documents can be collected inside and outside the community, thereby collecting exactly useful documents for the community. Since the contents of the body of a document are not analyzed, the document collection apparatus can quickly collect useful documents for the community independent of the language of the documents.

With the above mentioned configuration, the apparatus may further include a ranking unit for computing the significance indicating the importance of a document based on the information about the reference in the collected document group, and the information indicates the position of the document, for example, the URL and for ranking the document based on the significance. The next prospect determination unit can determine a prospect to be collected next based on the reference and the significance.

In the document collection apparatus for the community, the ranking unit ranks documents inside and outside the community base on the significance. The next prospect determination unit can define a document ranking higher as the prospect to be collected next inside and outside the community. Thus, the problem that prospects to be collected next are concentrated inside or outside the community, and that documents are collected only from inside or outside the community can be prevented.

Furthermore, the document collection apparatus for the community can further include a presentation unit for presenting a result of retrieving the collected document group separately to inside and outside the community. Thus, a client belonging to the community can obtain a result of retrieving documents separately from the inside and the outside the community.

Additionally, the above mentioned document collection apparatus for the community can further include a community determination unit for determining according to the information about the position of a document in a network, for example, according to the URL, etc. whether or not a document has been obtained inside the community. By determining the document according to the information about the position of the document in the network, it can be quickly determined whether or not the document is obtained inside the community.

Furthermore, the document collection apparatus for collecting documents through the network can also be configured as a document collection apparatus for a specified field for collecting documents relating to the specified field. To attain this, according to another aspect of the present invention, the document collection apparatus for collecting documents through a network is provided a positive sample document group which is a document group relating to the specified field and a negative sample document group which is a document group relating to a field not related to the specified field as a collected document group. The next prospect determination unit determines a prospect to be collected next based on a reference to the positive sample document group and to the negative sample document group. The document collection unit adds a collected prospect to be collected next to the positive sample document group. The document collection apparatus repeats determining the prospect to be collected next by the next prospect determination unit and collecting documents by the document collection unit until the number of documents in the positive sample document group is equal to or larger than a predetermined value. Thus, a document relating to the specified field can be quickly collected based on the reference without analyzing the contents of the document text.

The above mentioned document collection apparatus for a specified field can further include a reference score computation unit for computing the reference score indicating the frequency at which only the document in the positive sample document group refers to a document based on the reference in the collected documents. The next prospect determination unit can define a document having a high reference score as the prospect to be collected next. The document collection apparatus for a specified field can further include a co-reference score computation unit for computing the co-reference score indicating the frequency at which a document referred to by a collected document referring to a document in the positive sample document group is referred to together with a document in the positive sample document group based on the reference of the collected documents. The next prospect determination unit can define a document having a high co-reference score as a prospect to be collected next. Using the reference score and the co-reference score, a document relating to a field to be collected can be quickly collected without checking the contents of the document text.

The document collection apparatus for a specified field can be a document collection apparatus for simultaneously collecting documents relating various fields. Therefore, in the document collection apparatus for a specified field, a collected document group provided before collecting documents is defined as a union of a document group relating to a plurality of fields, and documents are collected with a document group relating to a certain field defined as a positive sample document group, and a union of a document group relating to the other fields defined as a negative sample document group.

Furthermore, each document collection apparatus can further include a summary unit for summarizing a collected document group based on the referencing expression used in the collected documents. There is a referencing expression indicating that the contents of a referenced document and a referring document are the same as each other, but are separately stored in a network. This referencing expression can be, for example, 'to the next document', 'Next', 'forward', 'Prev', etc. The summary unit summarizes these two or more documents having the reference of the above mentioned referencing expression.

Each document collection apparatus can further include a keyword assignment unit for assigning a keyword to a collected document based on the referencing expression used in the collected documents. Thus, the names of various keywords can be defined as keywords without analyzing the semantic contents of the document text.

When the referencing expression is used regardless of a referenced document, the keyword assignment unit does not assign the keyword. An example of a referencing expression used regardless of a referenced document can be 'return to top', 'to home', etc.

When he keyword assignment unit counts the number of different documents referenced by the referencing expression, and the number of documents is equal to or larger than a predetermined value, the keyword assignment unit can refuse to define the referencing expression as a keyword because this referencing expression is probably used regardless of a referenced document.

Furthermore, when the number of different documents referenced using the referencing expression is smaller than a predetermined value, the keyword assignment unit can further count the number of references indicating the number of times each of the collected documents is referenced by the referencing expression, and can determine whether or not the referencing expression can be defined as a keyword for each of the collected documents based on the number of different documents and the number of references.

The keyword assignment unit can further combine a keyword based on the referencing expression with the keyword extracted from the text of a collected document and the keyword extracted from the URL of the collected document. Thus, keywords extracted in various methods can be combined with each other.

Additionally, the above mentioned problems can be solved in the method including the steps of the process performed with each configuration according to the present invention. Furthermore, the above mentioned problems can be solved by reading a program used to direct a computer to perform the control similar to the functions performed with each of the above mentioned configurations according to the present invention from a computer-readable storage medium storing the program.

BRIEF DESCRIPTION OF THE DRAWINGS

The features and advantages of the present invention will be more clearly appreciated from the following description taken in conjunction with the accompanying drawings in which like elements are denoted by like reference numerals and in which:

FIG. 1 shows the principle of the present invention;

FIG. 3 shows an example of the data structure of the URL table;

FIG. 4 shows an example of the data structure of the reference table;

FIG. 5 shows an example of the data structure of the referencing expression table;

FIG. 6 shows an example of the data structure of the reference number table;

FIG. 8 is a flowchart of the process of determining a prospect to be collected next when documents in a community are collected;

FIG. 13 shows the configuration of the document collection apparatus according to the second embodiment of the present invention;

FIG. 16 is a flowchart of the process performed by the document collection apparatus according to the second embodiment of the present invention;

FIG. 17 shows the reference indicated by each union contained in the equation for computing a reference score;

FIG. 21 shows a result (2) of the experiment of the collection precision of the document collection apparatus;

FIG. 22 shows the configuration of the information processing device; and

DESCRIPTION OF THE PREFERRED EMBODIMENT

Figure 2:
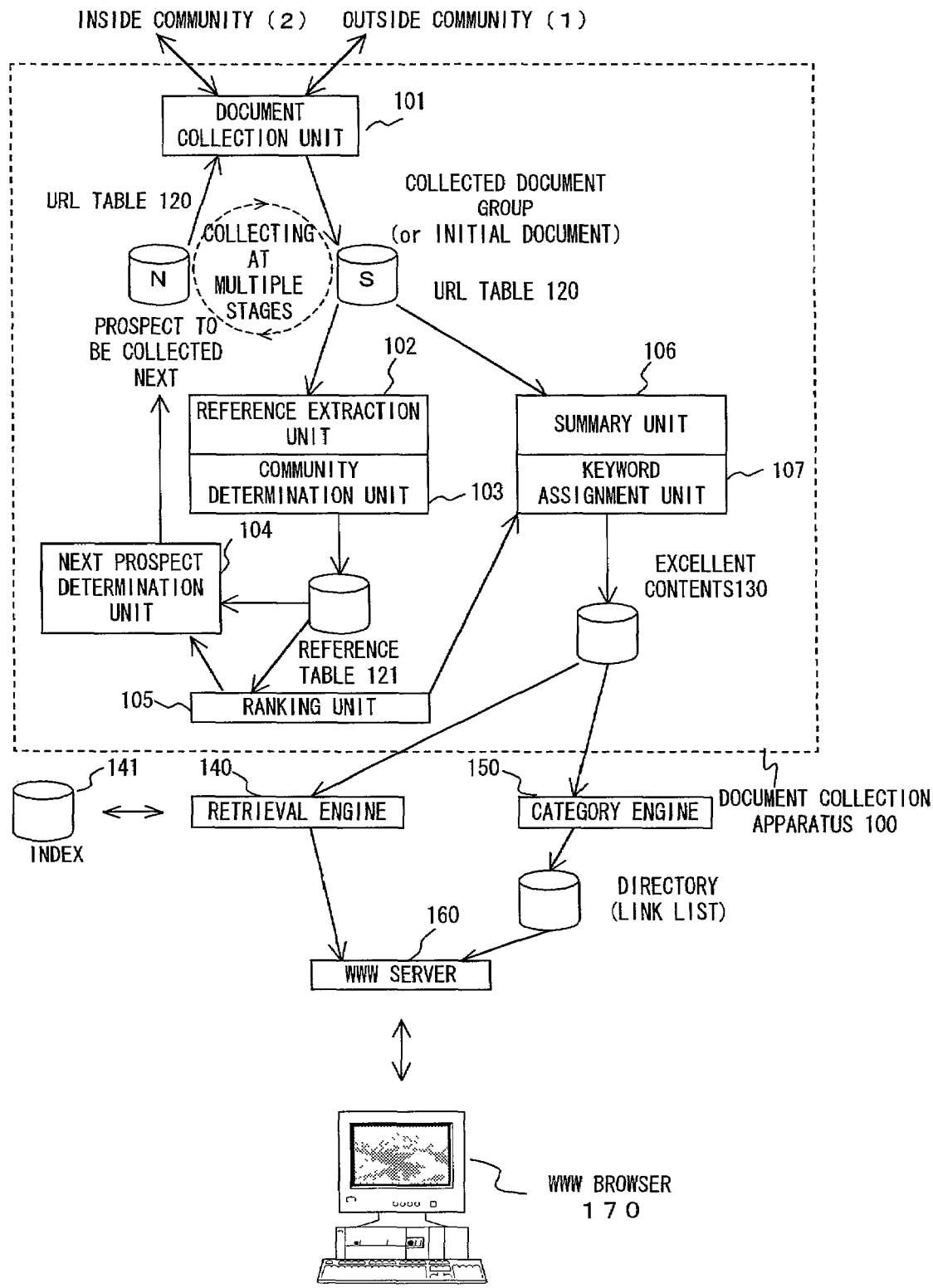
FIG. 2 shows the configuration of the document collection apparatus according to the first embodiment of the present invention.

An embodiment of the present invention is described below by referring to the attached drawings. The present invention relates to a document collection apparatus for collecting a document for each purpose. FIG. 1 shows the principle of the present invention. As shown in FIG. 1, a document collection apparatus 1 is connected to a network such as Internet, Intranet, etc. The document collection apparatus 1 comprises a document collection unit 2, a reference extraction unit 3, a community determination unit 4, a next prospect determination unit 5, a ranking unit 6, a URL determination unit 7, a reference score and co-reference score computation unit 8, a summary unit 9, and a keyword assignment unit 10. In FIG. 1, the unit indicated by dotted lines, that is, the community determination unit 4 and the reference score and co-reference score computation unit 8 are used or not used depending on the embodiment. Similarly, the arrow indicated by dotted lines, that is, a ranking result obtained by the ranking unit 6 is used or not used in determining a prospect to be collected next by the next prospect determination unit 5 depending on the embodiment.

The document collection apparatus according to an embodiment of the present invention collects a document for a community through a network. Therefore, the document collection apparatus for a community according to the embodiment comprises the document collection unit 2, the reference extraction unit 3, the community determination unit 4, the next prospect determination unit 5, the ranking unit 6, the summary unit 9 and the keyword assignment unit 10. The document collection apparatus for a community first collects documents evenly in a community, and then collects useful documents for the community from inside and outside the community.

The reference extraction unit 3 extracts the reference from a collected document group 20, and extracts an inter-document reference 22. When the collection starts, an initial document group is provided as the collected document group 20. The community determination unit 4 determines whether or not a referenced document of the collected document group 20, which is not collected, is in the community.

The next prospect determination unit 5 determines an uncollected document referenced by the collected document group 20, which is in the community as a prospect 21 to be collected next based on the determination by the community determination unit. The document collection unit 2 collects a document determined as the prospect 21 to be collected next, adds a group of newly collected documents (newly collected document group) to the collected document group 20, and defines it as a new collected document group 20. The document collection unit 2 determines whether or not the number of documents in the collected document group 20 is equal to or larger than the predetermined value. When the number of documents in the collected document group 20 is smaller than the predetermined value, the process of collecting documents in the community is repeated as described above. Thus, information is obtained for various fields to which the documents in the community belong by evenly collecting the documents larger in number than the predetermined value in the community. The information is used in collecting useful documents for the community inside and outside the community.

When the number of documents in the collected document group 20 is equal to or larger than a predetermined value, useful documents for the community are collected inside and outside the community. The reference extraction unit 3 extracts the reference from a newly collected document group, and the community determination unit 4 determines whether or not the uncollected referenced document is a document in the community. The ranking unit 6 ranks an uncollected document referenced by a collected document inside and outside the community separately according to the reference and the information indicating the position in the network of the document, for example, an URL. The ranking unit 6 comprises the URL determination unit 7, and the URL determination unit 7 determines the similarity in URL character strings between a referenced document and a referring document. The ranking unit 6 considers the similarity in character string of the URL determined by the URL determination unit 7 when ranking the documents.

The next prospect determination unit 5 determines an uncollected document ranked high inside and outside the community as the prospect 21 to be collected next from the network, and the document collection unit 2 collects the document determined as the prospect 21 to be collected next. Thus, the document collection apparatus for a community according to an embodiment of the present invention collects a useful document for the at multiple levels. When the number of documents collected inside and outside the community reaches a predetermined value, the summary unit 9 summarizes the collected document group 20 based on the referencing expression. The keyword assignment unit 10 assigns a keyword to the collected documents 20 based on the referencing expressions used in the collected documents 20 and the number of occurrences of the referencing expressions. The ranking unit 6 ranks the collected documents 20 as described above. The summarized, keyword-assigned, and ranked collected documents 20 are stored as a collected document file 23. As described above, the document collection apparatus for a community does not analyze the contents of the document text, thereby collecting a document suitable for each purpose independent of a language.

Furthermore, the document collection apparatus according to another embodiment of the present invention collects documents relating to a specified field. To attain this, the document collection apparatus relating to the specified field comprises the document collection unit 2, the reference extraction unit 3, the next prospect determination unit 5, the ranking unit 6, the reference score and co-reference score computation unit 8, the summary unit 9, and the keyword assignment unit 10. In the document collection apparatus relating to a specified field, it is not necessary to distinguish the documents inside a community from those outside. Therefore, no process is performed to determine the community.

In a document collection apparatus relating to a specified field, a document group relating to a specified field is defined as a positive sample document group, and a document group not closely relating to the specified field is defined as a negative sample document group before starting the collection of documents. The collected document group 20 is a union of a positive sample document group and a negative sample document group. The reference score and co-reference score computation unit 8 computes the level of the relation of a document to a specified field as the reference score and the co-reference score based on the references between a document and the positive sample document group, and between the document and the negative sample document group. The next prospect determination unit 5 defines an uncollected document having a high reference score or co-reference score computed by the reference score and co-reference score computation unit 8 as a prospect to be collected next without the ranking process performed by the ranking unit 6. Furthermore, In the collected document group 20 contained in the negative sample document group, the next prospect determination unit 5 removes a document having a high reference score or co-reference score from the negative sample document group, and adds it to the positive sample document group. The document collection unit 2 collects a document recognized as the prospect 21 to be collected next, and adds it to the positive sample document group. As described above, the determination of a prospect to be collected next and the collection of documents are repeated until the number of documents in the positive sample document group reaches a predetermined value. Other operations are the same as those described above.

Described below is the document collection apparatus for a community for collecting useful documents for a community according to the first embodiment of the present invention. A community in the network according to the first embodiment of the present invention can be, for example, an in-house site, an industrial site (business community), and a user group in a network of a specified topic, etc. Among them, the in-house site is frequently represented by Intranet. The industrial site is represented by Extranet formed by a plurality of corporation systems. The document collection apparatus for collecting necessary documents on the in-house site is applicable to an Intranet portal in an enterprise referenced as a corporate portal (also referenced as an EIP (Enterprise Information Portal)).

In the community portal, it is required to automatically collect the documents useful for a community by priority. For example, in a corporate portal, documents relating to business are to be automatically collected. The first embodiment of the present invention realizes the automatic collection of those documents. To attain this, the document collection apparatus according to the first embodiment has the following concept.

Documents useful for a specific community are those frequently referenced by a number of documents in the community, or those referenced by important documents in the community.

FIG. 2 shows the configuration of the document collection apparatus according to the first embodiment of the present invention. As shown in FIG. 2, a document collection apparatus 100 comprises a document collection unit 101, a reference extraction unit 102, a community determination unit 103, a next prospect determination unit 104, a ranking unit 105, a summary unit 106, and a keyword assignment unit 107.

As described above, in the document collection apparatus 100, the collection process is repeated several times from among the documents in a community. Then, the collection process is repeated several times from among the documents inside and outside the community. Thus, the feature of the document collection apparatus according to the present invention resides in that documents are collected a plurality of times in a plurality of stages.

Before actually collecting documents, an initial document group is provided as a collected document group S. The initial document group is a starting point of the collection. The initial document group can be, for example, the site top page, the references of the top page, etc. A top page refers to a page which can be an entry point of a site. A collected document group or an initial document group is practically provided in the document collection apparatus 100 as a URL table 120.

Then, the reference extraction unit 102 extracts the reference from the collected document group S, stores the URL of the document which is referenced by the collected document group S (hereinafter referenced as a referenced document) in the URL table 120, and stores the extracted reference in a reference table 121. The community determination unit 103 determines based on the URL whether the referenced document which is referenced by at least one document in the collected document group S is a document inside the community or outside the community, and stores a determination result in the reference table 121.

The document collection apparatus 100 collects documents in the community one or more times. Documents are collected evenly. The next prospect determination unit 104 determines as a prospect to be collected next (hereinafter referenced as a prospect N to be collected next) the documents in the community which have not been collected in the referenced documents of the collected document group S extracted by the reference extraction unit 102. The document collection unit 101 collects a group of documents determined as prospects N to be collected next, adds collected documents to the collected document group, and defines it as a new collected document group S. The collection of the documents in the community is performed until the predetermined number of documents have been collected. All documents in the community are not to be collected, but approximately ¼ through ½ of all documents in the community need to be collected. Even partially collecting the documents in the community, the information about the field of the useful documents in the community can be obtained.

After the number of documents collected in the community by the document collection unit 101 has reached a predetermined value, the document collection apparatus 100 collects the documents inside and outside the community one or more times. In this case, as described above, the document collection unit 101 collects documents, the reference extraction unit 102 and the community determination unit 103 store information in the URL table 120 and the reference table 121, the ranking unit 105 assigns the significance to a referenced document based on the reference and the URL of the document, and ranks the referenced document based on the significance.

The next prospect determination unit 104 determines uncollected referenced documents, which are a document group ranking the n1-th highest n1 in the documents in the community, and a document group ranking the n2-th highest in the documents outside the community, as the prospects N to be collected next. By determining the prospects N to be collected next separately between inside and outside the community, it is prevented that the documents are unevenly collected inside or outside the community.

Then, as in the collection of documents in the community, the document collection unit 101 collects the prospects N to be collected next inside and outside the community, adds the collected documents to the collected document group, and obtains a new collected document group S. The document collection apparatus 100 repeats collecting documents inside and outside the community until the number of collected documents has reached a predetermined value.

After the number of documents collected inside and outside the community by the document collection unit 101 has reached the predetermined value, the collected documents are selected. The documents are selected by the summary unit 106, the keyword assignment unit 107, and the ranking unit 105. First, based on the character string used when other documents are referenced (also referenced as referencing expression), the summary unit 106 summarizes the collected documents which have the same contents, and are divided into a plurality of documents.

The keyword assignment unit 107 determines a keyword based on the referencing expression in the documents, and assigns a keyword to a document. To be more practical, the keyword assignment unit 107 excludes the referencing expressions frequently used regardless of the contents of the referenced documents such as 'return to top', 'to home', etc. Then, the keyword assignment unit 107 counts the number of different documents referenced by each referencing expression, and stores them in a referencing expression table 122 (not shown in FIG. 2). Furthermore, it counts the number of occurrences of each referencing expression in each collected document, and stores the result in a reference frequency table 123 (not shown in FIG. 2). The keyword assignment unit 107 computes the weight of the referencing expression for each collected document based on the count result, and assigns the referencing expression of a certain value as a keyword to each collected document in order of weight.

The ranking unit 105 assigns a significance level to each document based on the reference and the URL of the document, and ranks the document based on the significance level. Thus, the document collection apparatus 100 according to the present embodiment collects documents based on the reference and the URL, summarizes the documents, assigns a keyword, and ranks the documents without analyzing the contents of the document text.

As described above, the document collection apparatus 100 provides the summarized, keyword-assigned, and ranked document group as excellent contents 130. The excellent contents 130 are provided as an index 141 through a retrieval engine 140, provided for a server 160 through the retrieval engine 140, and provided for the server 160 after directory-edited by a category engine 150. The client of the server 160 can view the excellent contents 130 provided for the server 160 through a browser 170.

The data structure of each table is described below by referring to FIGS. 3 through 6. FIG. 3 shows an example of the data structure of the URL table 120. As shown in FIG. 3, the URL table 120 stores a document ID (Identification information) for identification, the URL of a document, a collection completion flag indicating whether or not a document has been collected, a community flag indicating whether or not it is a document in a community, and the significance level of a document. The document ID and the URL are stored when the reference extraction unit 102 extracts the referenced document referred to by a collected document. The collection completion flag is set on (set to 1) when the document collection unit 101 collects the document. The community flag is set on (set to 1) when the community determination unit 103 determines that the document is inside the community. The significance level is computed and stored by the ranking unit 105 based on the reference and the feature of the URL in a character string.

FIG. 4 shows an example of the data structure of the reference table 121. As shown in FIG. 4, the reference table 121 stores the information about the reference of documents. To be more practical, the reference table 121 stores a referring document ID which is a document ID of a referring document, a referenced document ID1 which is a document ID of the document in the community referenced by the referring document, and the referenced document ID2 which is a document ID of the document outside the community referenced by the referring document. The information is stored by the reference extraction unit 102.

FIG. 5 shows an example of the data structure of the referencing expression table 122. As shown in FIG. 5, the referencing expression table 122 stores the information about the frequency represented by each referencing expression in a collected document. To be more practical, the referencing expression table 122 stores an expression ID for identification of the referencing expression, the referencing expression (character string), the frequency DF(w) indicating the number of different documents (document frequency) referenced using the referencing expression, and a necessity/non-necessity flag indicating whether or not it is to be used as a keyword. The information is all stored by the keyword assignment unit 107.

FIG. 6 shows an example of the data structure of the reference frequency table 123. As shown in FIG. 6, the reference frequency table 123 stores the frequency (Term Frequency) TF(d,w) at which each collected document is referenced by each referencing expression. The information is stored by the keyword assignment unit 107. To be more practical, when a doc1 is obtained by referring to a link embedded in a referencing expression in a document doc2, the term frequency of the doc1 is incremented by 1. In FIG. 6, the document whose document ID is doci is referenced at TF(doci,rwj) using the referencing expression whose expression ID is rwj. For example, in FIG. 6, the document whose document ID is doc1 is a link target document embedded in the referencing expression whose expression ID is rw1, and the number of links is 19.

Described below is the method of collecting a useful document for a specified community by the document collection apparatus according to the first embodiment of the present invention. In the description, the following notation is used.

LT (S) indicates a document group which is a referenced document referred to by the document group S.

X-Y indicates a difference set between a set X and a set Y.

Figure 7:
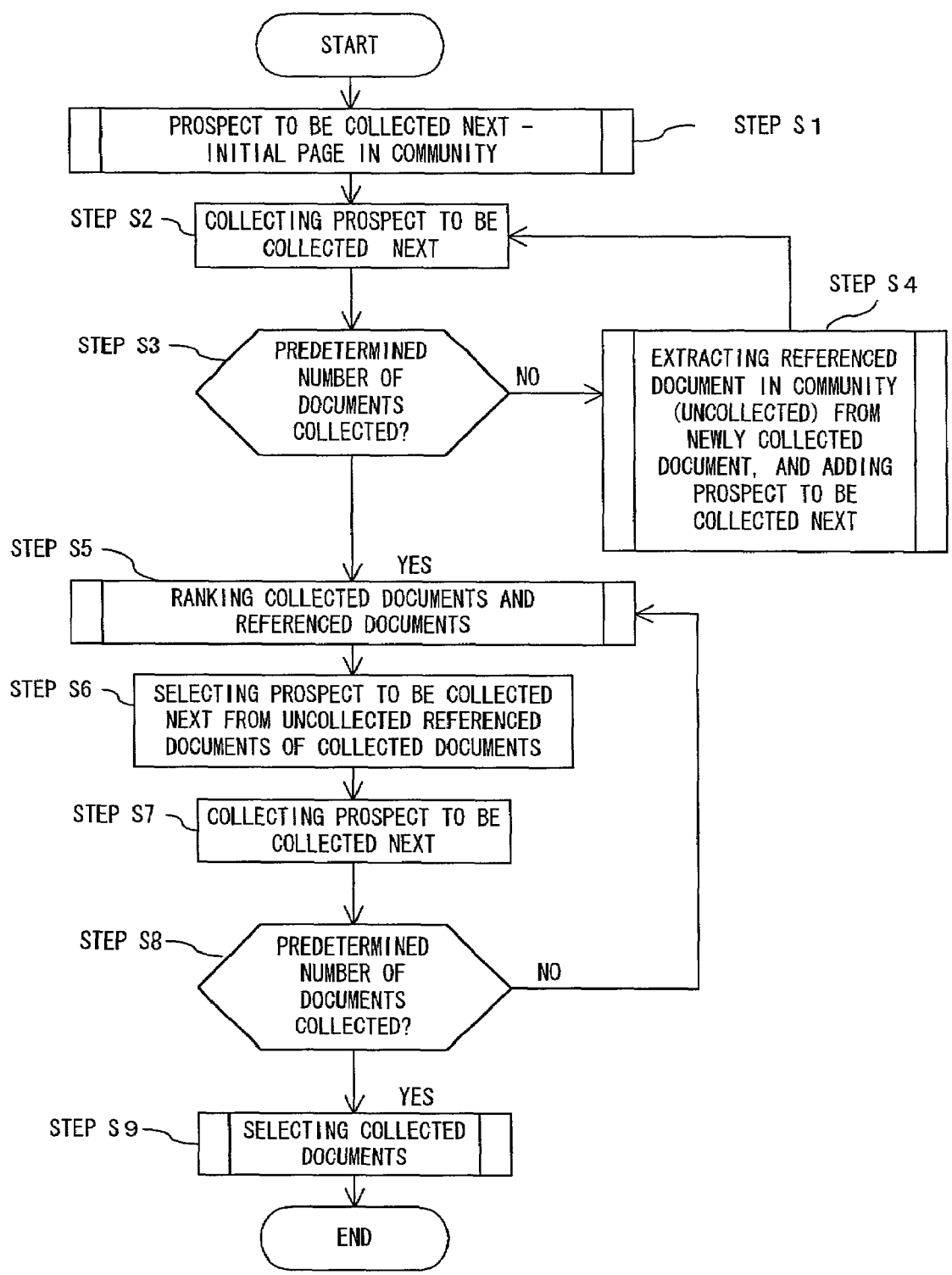
FIG. 7 is a flowchart of the rough flow of the processes performed by the document collection apparatus according to the first embodiment of the present invention.

First, the outline of the flow of the process of collecting documents for a specified community is described by referring to FIG. 7. First, when the collection is started, the documents in the community are provided as the initial document group (the document group functioning as the starting point of the collection) of the collected document group S.

Based on the extraction result of the reference by the reference extraction unit 102, and the determination result by the community determination unit 103 as to whether or not the referenced document is a document in a community, the next prospect determination unit 104 extracts a prospect N to be collected next (step S1). The process of extracting a prospect N to be collected next is described later in detail.

Then, the document collection unit 101 collects the prospect N to be collected next based on the URL stored in the URL table 120 (step S2), and the collection completion flag for the collected document stored in the URL table 120 is set on. Thus, the document collection unit 101 adds a newly collected prospect N to be collected next to the collected document group S. That is, the document group expressed by the equation S∪N is newly defined as a collected document group S.

The document collection unit 101 determines whether or not the number of documents contained in the collected document group S is equal to or larger than a predetermined number of documents (step S3). The determination is performed by counting the number of documents for which the collection completion flag stored in the URL table 120 is set on (set to 1). When the number of documents contained in the collected document group S is not equal to or larger than a predetermined number of documents (No in step S3), the next prospect determination unit 104 determines again a prospect N to be collected next (step S4), thereby returning control to step S2. In determining a prospect N to be collected next in the second and subsequent determining process, the next prospect determination unit 104 extracts a document in the community in the uncollected referenced documents as prospects N to be collected next based on the extraction result of the reference by the reference extraction unit 102 for the newly collected documents (hereinafter referenced as newly collected documents) in this collecting process, and based on the determination result as to whether or not the referenced document referred to by the newly collected document by the community determination unit 103 is a document in the community. Since the process in step S4 is similar to the process in step S1, it is described later when the process in step S1 is described.

When the number of documents in the collected document group S is equal to or larger than a predetermined number of documents (YES in step S3), the next prospect determination unit 104 determines a prospect N to be collected next from the documents inside and outside the community. To attain this, the reference extraction unit 102 first extracts the reference of a newly collected document, and the community determination unit 103 determines whether or not the referenced document Mew: referred to by the newly collected document is a document inside a community. Then, the ranking unit 105 assigns a significance level to the collected document and its referenced document, that is a SULT(S), and ranks an uncollected referenced document, that is, an LT(S)-S based on the significance level (step S5). The process in step S5 is described later in detail.

Then, the next prospect determination unit 104 defines in the LT(S)-S a document group ranking as one of the top n1 documents in the document group in the community, and a document group ranking as one of the top n2 documents in the document group outside the community as a prospect N to be collected next (step S6). By extracting the prospects N to be collected next with the documents inside and outside a community separated from one another, the collected documents can be prevented from being concentrated inside or outside the community.

The document collection unit 101 collects the prospect to be collected next based on the URL stored in the URL table 120 (step S7), and sets the collection completion flag of the collected documents ON (set to 1). The document collection unit 101 determines whether or not the number of documents contained in the collected document group S is equal to or larger than a predetermined number of documents by counting the number of the documents whose collection completion flag is set on (set to 1) in the URL table 120 (step S8).

When the number of documents contained in the collected document group S is not equal to or larger than the predetermined number of documents (NO in step S8), control is returned to step S5. If the number of documents contained in the collected document group S is equal to or larger than the predetermined number of documents (YES in step S8), then the ranking unit 105, the summary unit 106, and the keyword assignment unit 107 select documents in the collected document group S (step S9). The process in step S9 is described later in detail.

When documents in a community are collected, the process of determining a prospect N to be collected next is described in detail. This process corresponds to steps S1 and S4 shown in FIG. 7.

First, the reference extraction unit 102 extracts a referenced document referenced by a newly collected document (step S11). Since it is not necessary to store a plurality of the same URLs, the reference extraction unit 102 stores the URL of the referenced document in the URL table 120 when the same URL as each of the extracted referenced documents is not stored in the URL table 120 (step S12). When the URL of the referred document is stored, the reference extraction unit 102 sets the collection completion flag OFF (set to 0).

Then, the community determination unit 103 determines whether or not an extracted referenced document is a document inside a community based on the character string of the URL of the referenced document stored in the URL table 120. If it is determined that the document is inside the community, then the community determination unit 103 sets the community flag of the URL table 120 ON (set to 1). Otherwise, the community determination unit 103 sets the community flag OFF (set to 0) (step S13). Furthermore, the reference extraction unit 102 stores the reference in each column of the reference table 121.

According to the present embodiment, a community is given as a set of documents, that is, a document group, in a network. Therefore, it is determined whether or not a document is in the same community based on the URL indicating a document group. To be more practical, it is determined whether or not a document is in a community based on the feature of the character string of a URL as follows.

When a community is an in-house site, a document having the same domain name (fujitsu.co.jp, etc.) as the in-house site is recognized as a document in the community.

When a community is an industrial site, a document having the same domain name as any of a plurality of enterprise sites belonging to the industrial site is recognized as a document in the community.

When a community is a user group, a document having a URL containing the same character string as any URL (for example, www.fujitsu.co.jp/foo/) of the site (also referenced as a home page) of each user is recognized as a document in the community.

The next prospect determination unit 104 recognizes a document in the community as a prospect N to be collected next among documents which are referenced documents referred to by collected documents, and are uncollected documents, namely, LT(S)-S. Practically, the next prospect determination unit 104 refers to the URL table 120, and determines as a prospect N to be collected next a document whose collection completion flag is set OFF (set to 0), and whose community flag is set ON (set to 1) (step S14), thereby terminating the process. Such a prospect N to be collected next can be expressed by equation (1) as follows.

$$N=\{d|d \in LT(S)\text{-}S, \text{ where } d \text{ indicates in-community}\} \quad (1)$$

Thus, by determining a prospect N to be collected next and evenly collecting documents in a community, the information about semantically various documents required in the community can be evenly obtained.

Figure 9:
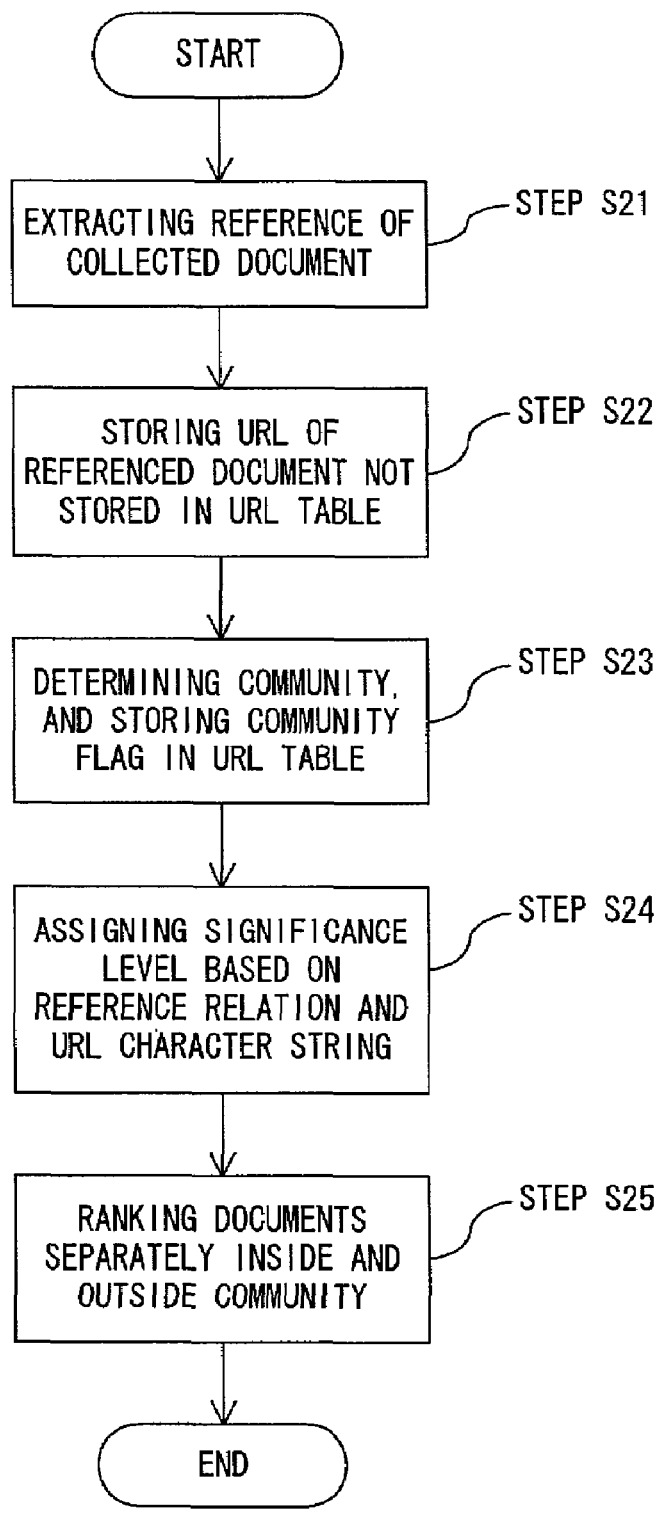
FIG. 9 is a flowchart of the process of ranking collected documents and a referenced document.

The process of ranking collected documents and their referenced documents is described below by referring to FIG. 9. The process corresponds to step S5 shown in FIG. 7.

The reference extraction unit 102 and the community determination unit 103 extract the reference of a newly collected document, and stores the reference together with the determination result of the community in the URL table 120 and the reference table 121 (steps S21 through S23) Since the processes in steps S21 through S23 are similar to those in steps S11 through S13, the detailed explanation is omitted here.

Then, the ranking unit 105 computes the significance level based on the reference stored in the reference table 121 and the feature of the character string of the URL stored in the URL table 120 for a collected document and its referenced document, that is, S∪LT(S), and stores the obtained significance level in the URL table 120 (step S24). The ranking unit 105 ranks uncollected referenced documents, that is, LT(S)-S, separately for inside and outside the community based on the community flag and the significance level stored in the URL table 120 (step S25).

Described below in detail is the process of computing the significance level in step S24. As described above, the ranking unit 105 computes the significance level of a document using the reference of a document and a URL without analyzing the contents of a collect document. The significance level assigned to a document based on the reference is hereinafter referenced link significance. The basic concept of assigning link significance to a document is described below.

A document frequently referenced by a document with a URL having low similarity is significant.

For example, a plurality of documents provided in the same site are normally referenced by other documents in the site, but the URLs of the documents are similar to one another. Therefore, the significance of a document referenced by a URL having high similarity is assumed to be low.

A document referenced by a larger number of documents are more significant, and a document referenced by a significant document having low similarity of URL is significant.

For example, famous directory services, etc. and government and municipal offices, etc. are referenced by a number of documents. A document referenced by these significant documents is considered to be significant. Documents, etc. provided for a service (site) including a number of documents and a mirror site are frequently referenced within the site. However, since the URLs of the documents in the same site are normally similar, it is possible to prevent documents in the same site from being frequently retrieved based on the concept that a document having low URL similarity is significant.

The similarity of a URL is defined according to the character information about a URL such that the similarity can be the lowest when a document has different server address, path, and file name and such that the similarity of a document in a mirror site or the same server can be high.

By introducing the above mentioned three concepts, all reference values are not equally processed, but a weight value corresponding to each link significance is assigned to the reference values. To be more practical, a weight value is assigned as a reciprocal of the similarity of the URLs of the referring document and the referenced document. Described below in detail is the method of computing the link significance.

Assuming that:

DOC={p1, p2, . . . , pn} indicates a set of documents whose link significance is to be computed;

$W_p$ indicates the link significance of a document p;

Ref(p) indicates a set of referenced documents of a document p;

Refed(p) indicates a set of referring documents of a document p;

sim(p,q) indicates the URL similarity of documents p and q; and diff(p,q)=1/sim(p,q) indicates the difference, the weight lw(p,q) of the reference from the document p to the document q is defined by equation (2) as follows.

$$lw(p, q) = diff(p, q) \Big/ \sum_{i \in Ref(p)} diff(p, i) \qquad (2)$$

$$= \frac{1}{sim(p, q) \sum_{i \in Ref(p)} \frac{1}{sim(p, i)}}$$

As shown by the equation (2) above, lw(p,q) becomes larger when the similarity sim(p,q) between the URLs of p and q is lower and when the number of reference from p is smaller.

The link significance of each document can be defined as a solution of simultaneous linear equations shown below where $C_q$ is a constant (lower limit of the significance which can be different for each document) to each p∈DOC.

$$W_q = C_q + \sum_{p \in Refed(q)} W_p \times lw(p, q) \qquad (3)$$

The ranking unit 105 assigns the link significance to each document by solving the simultaneous linear equations. The explanation of the method of solving the simultaneous linear equations is omitted here because there are a number of existing algorithms. By the equations (2) and (3), it is recognized that the above mentioned concepts are realized.

Described below are the URL similarity sim (p,q) of the documents p and q in the equations (2) and (3). The URL similarity is computed by the URL determination unit (not shown in the attached drawings) of the ranking unit 105. Normally, the URL of a document comprises three types of information about a server address, a path, and a file name. For example, the URL of a WWW document www.flab.fujitsu.co.jp/hypertext/news/1999/ product1.html' comprises three types of information about a server address (www.flab.fujitsu.co.jp), a path (hypertext/news/1999), and a file name (product1.html).

According to the present embodiment, the URL similarity of the given two documents p and q is defined by the above mentioned combination of three data. The similarity sim(p, q) can be, for example, the domain similarity sim_domain (p,q) and the merging similarity sim_merge(p,q) described below.

The domain similarity sim_domain(p,q) is computed based on the similarity of a domain. A domain refers to a latter half of a server address, and indicates a corporation or an organization. In the case of a US server whose server address ends with .com, .edu, .org, etc., the last two character strings of the server address correspond to a domain. In the case of a server in other countries whose server address ends with .jp, .fr, etc., the last three character strings of the server address correspond to a domain.

The domain similarity of the documents p and q is defined by the following equation sim_domain($p,q$)=1/α (when p and q have the same domain)=1 (when p and q have different domains)

where α is a constant, and a actual value larger than 0 and smaller than 1.

As the sim(p,q), the similarity sim_merge(p,q) obtained by merging the above mentioned three types of information can be defined as follows.

$$\text{sim\_merge}(p,q) = (\text{similarity of server address}) + (\text{similarity of path}) + (\text{similarity of file name})$$

Described below is the method of computing each term of the right side.

The similarity of a server address is defined by following the hierarchical level of an address backwards, and assigning the similarity of 1+n when matching results are obtained up to the n level. For example, since www.fujitsu.co.jp matches www.flab.fujitsu.co.jp up to the third level, the similarity is 4. Since www.fujitsu.co.jp does not match www.fujitsu.com at all (non-matching level), the similarity is 1.

The similarity of a path is defined by comparing from the start the elements of a path delimited by '/', and the matching levels are checked. For example, since /doc/patent/index.html matches /doc/patent/1999/2/file.html up to the second level, the similarity is 3.

The similarity of a file name is defined as 1 when file names match.

By using sim_merge(p,q), retrieving a number of documents having similar URLs can be also avoided.

Thus, the ranking unit 105 assigns a significance level to a document, and ranks a document assigned a higher significance level at a higher order.

Thus, according to the present embodiment, the ranking unit 105 assigns a significance level to a document without analyzing the contents of the document text, that is, at a high processing speed with high precision based on the obtained reference and the feature of the character string of the URL of a document, and ranks the document based on the significance level.

Figure 10:
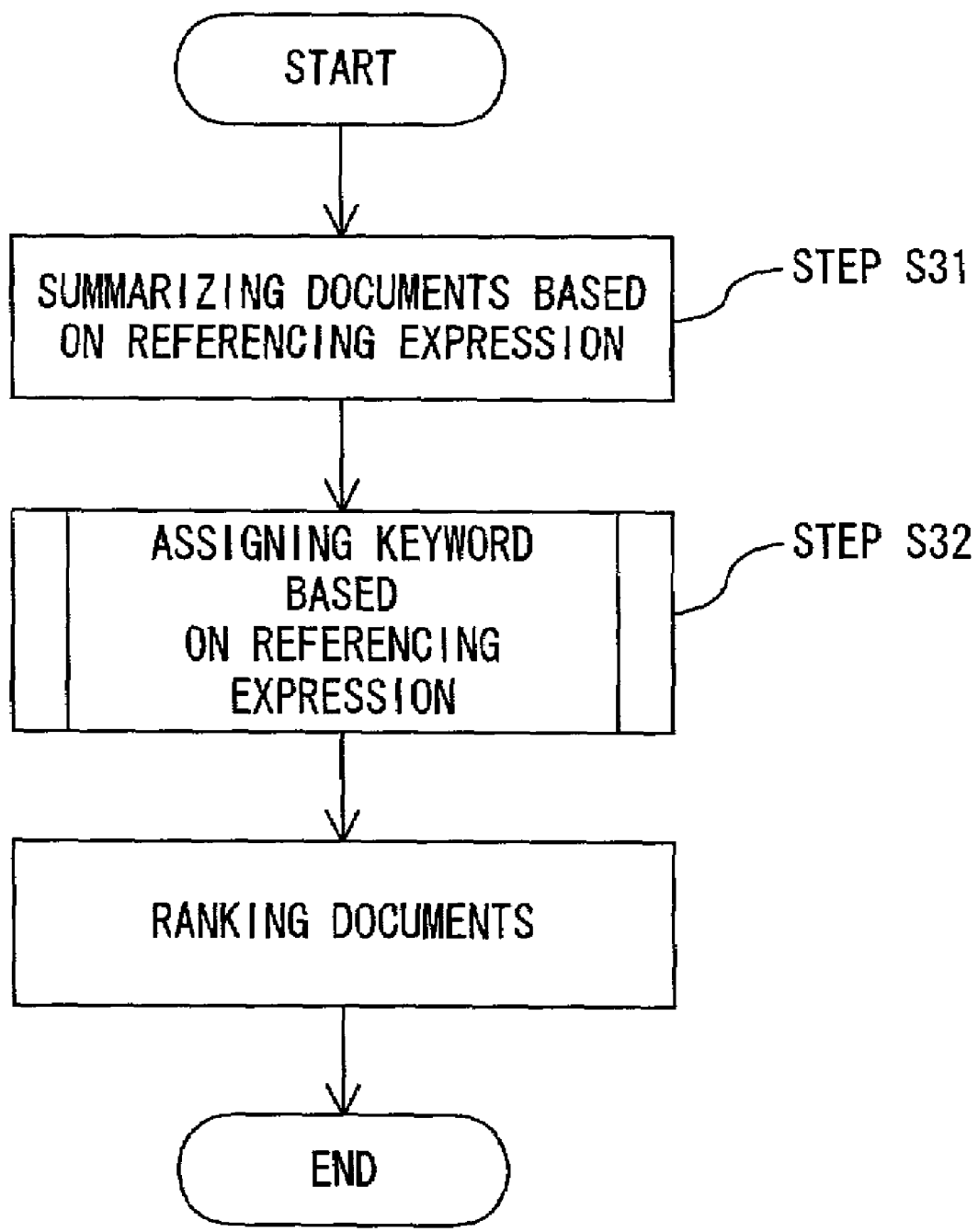
FIG. 10 is a flowchart of the process of selecting a collected document.

The process of selecting a collected document is described in detail by referring to FIG. 10. The process corresponds to step S9 shown in FIG. 7. First, the summary unit 106 summarizes the collected document group S based on the collected document group S based on the referencing expression used in the collected document group S (step S31). For example, in the HTML (Hyper Text Mark-up Language) a referencing expression corresponds to a portion encompassed by the anchor tag. The example does not limit the descriptive language of a document.

To be more practical, a summary referencing expression table not shown in the attached drawings stores a referencing expression (a character string used for reference) such as 'next', 'forward', etc. A document using referencing expressions such as the 'next', 'forward', etc., has a referring document or a referenced document having the same contents, but a plurality of distributed URLs. The summary unit 106 extracts a referencing expression stored in the summary referencing expression table from a document, and summarizes the document as follows.

When a document doc 2 is referenced by a document doc 1 using the expressions such as 'more', 'continued', 'Next', etc., the summary unit 106 degenerates the document doc 2 into the document doc 1, and repeats the operation as far as possible.

When a document doc 2 is referenced by a document doc 1 using the expressions such as 'forward', 'return, 'Prev', etc., the summary unit 106 degenerates the document doc 1 into the document doc 2, and repeats the operation as far as possible.

Then, the keyword assignment unit 107 assigns a keyword to a collected document S based on the referencing expression (step S32). A keyword assigning process is described later in detail. Finally, the ranking unit 105 assigns a significance level to a collected document as in step S24 shown in FIG. 9 above, and stores the significance in the URL table 120. The ranking unit 105 ranks a collected document based on the significance level (step S33), thereby terminating the process.

Figure 11:
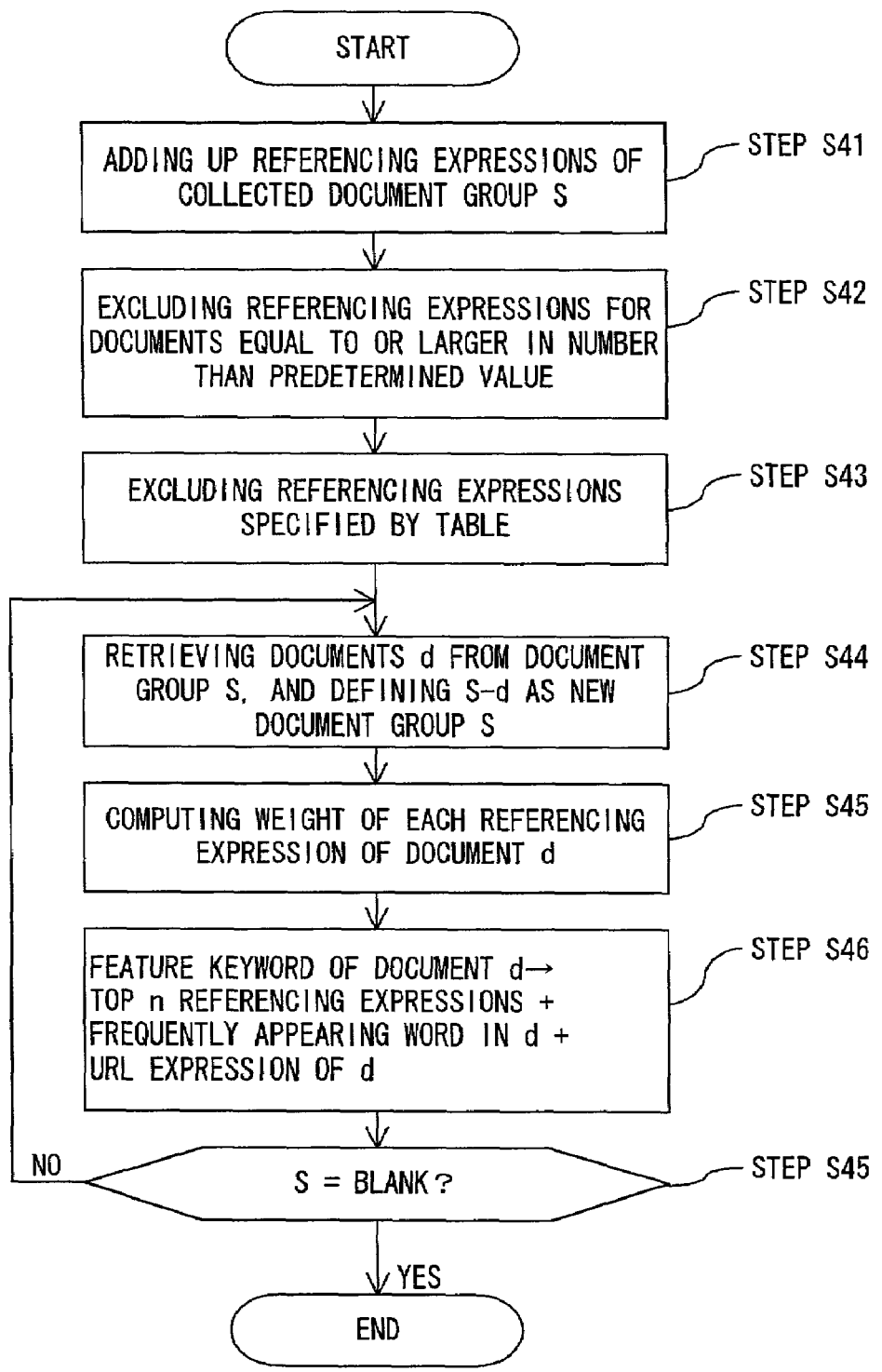
FIG. 11 is a flowchart of the keyword assigning process.

Then, the keyword assigning process in step S32 is described below in detail by referring to FIG. 11. First, in the referencing expressions used in collected documents, a frequently used referencing expression, regardless of a content of a referenced document such as 'to home', 'return to top', etc., is stored in an unnecessary word dictionary not shown in the attached drawings. The keyword assignment unit 107 extracts a referencing expression from the collected document group S, counts the frequency DF (Document Frequency) (w) of different documents referenced using a referencing expression w for each referencing expression, and stores an expression ID identifying the referencing expression w, its referencing expression (character string), and an aggregation result of the DF(w) in the referencing expression table 122 (step S41). At this stage, a necessity/non-necessity flag is set OFF (set to 0).

The keyword assignment unit 107 excludes referencing expressions w whose DF(w) is equal to or larger than a predetermined value from prospective keywords (step S42). That is, assuming that the total number of documents including referenced documents is N, the keyword assignment unit 107 does not recognize the referencing expression w expressed by the following equation (4) as a keyword.

$$DF(w) > \alpha N \qquad (4)$$

where α is a constant, and can be, for example, 0.1.

Furthermore, the keyword assignment unit 107 excludes referencing expressions w which are specific referencing expressions stored in the unnecessary word dictionary from prospective keywords (step S43). Since these referencing expressions are assumed to be used regardless of referenced documents, it is not appropriate to use them as keywords.

The keyword assignment unit 107 retrieves a document d from a collected document S, and defines a difference set between the collected document groups S and d, that is, S-d as a new collected document group S (step S44).

The keyword assignment unit 107 counts the frequency (Term Frequency) TF(d,w) at which each referencing expression is referenced in the document d, and computes the weight W(d,w) of each referencing expression for the document d by the following equation (5) (step S45).

$$W(d,w) = TF(d,w) \log(N/DF(w)) \qquad (5)$$

The keyword assignment unit 107 accesses the referencing expression table 122, and sets the necessity/non-necessity flags of n referencing expressions ON (sets to 1) in order from the largest weight w of the referencing expression. That is, n referencing expressions are the keywords of the document d in order from the largest weight w.

Thus, the keywords based on the referencing expressions are obtained as the keywords of various types unlike the keyword based on the words contained in the text of the document d. For example, various names (a formal name, an abbreviated name, a commonly used name, a name in a foreign language, for example, in Japanese) of an enterprise can be obtained from the referencing expressions to the home page of the enterprise. In addition, for example, relating to an English keyword 'Linux', the Japanese keywords 'リナックス [rinakkusu]', ライナックス[ralnakkusu]', etc. can be obtained as various keywords. On the other hand, since only one of these various names can be normally used in the text of a document, various names cannot be obtained as keywords when a keyword is obtained from the text.

Furthermore, a keyword frequently appearing in the text of the document d, and a keyword obtained from the URL indicating the document d, for example, fujitsu as a keyword from http://www.fujitsu.com/ can be added to a keyword obtained from a referencing expression. Thus, various keywords can be assigned to the document d.

Figure 12:
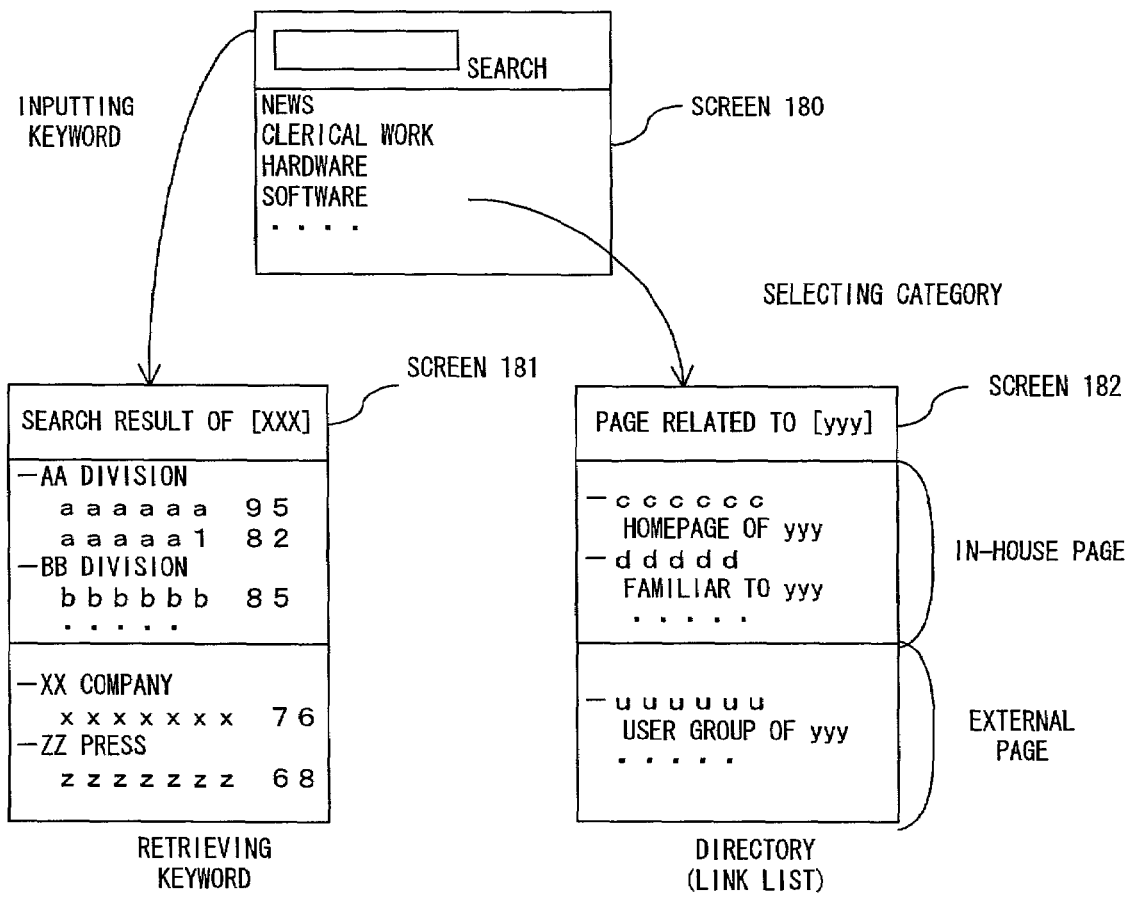
FIG. 12 shows an example of the screen on which collected documents are provided.

FIG. 12 shows an example of a screen for providing a user with documents collected through a document collection apparatus according to the first embodiment of the present invention. In FIG. 12, the collected excellent contents 130 are divided into directories to be provided for a client of the server 160. The client inputs a keyword on a screen 180, or selects a category to display a link (reference) to a document to be viewed or a link set on the screen.

When the client inputs a keyword, a link to a document retrieved based on the keyword as shown on a screen 181 is displayed with a significance level. According to the present embodiment, various names of the input keyword can be retrieved together. When a category is selected, a link set to a document relating to the selected category is displayed as shown on a screen 182.

As shown on the screens 181 and 182, a document can be presented separately inside and outside a community according to a community flag stored in the URL table 120.

Described below is the document collection apparatus according to the second embodiment of the present invention. The document collection apparatus according to the second embodiment of the present invention collects documents relating to a specific field. The following concept is adopted in the document collection apparatus according to the present embodiment.

In a network, documents having parent-child/brothers relations in reference are normally similar in content to each other. A document assumed to have parent-child/brothers relations with a document group possibly has contents similar to those of the referring document. Among the documents having parent-child/brothers relations with the referring document, documents having a high reference score (parent-child relations) and a high co-reference score (brother relations) are repeatedly collected, incorporated into the referring document at multiple stages, thereby collecting documents relating to a corresponding field.

FIG. 13 shows the configuration of the document collection apparatus according to the second embodiment of the present invention. As shown in FIG. 13, a document collection apparatus 200 comprises the document collection unit 101, the reference extraction unit 102, the next prospect determination unit 104, a reference score and co-reference score computation unit 201, the ranking unit 105, the summary unit 106, and the keyword assignment unit 107. The reference score and co-reference score computation unit 201 computes a reference level at which a document is related to a specified field based on the reference of the document. The function of each of the other units is described above in the first embodiment of the present invention.

In the document collection apparatus according to the second embodiment, a typical document in a field is collected using an existing retrieval engine and a link set before starting the collection of documents, and is provided as a positive sample document group PS. Then, a document in any field not overlapping the field of the above mentioned document is similarly collected and provided as a negative sample document group NS, and the PS∪NS is defined as a collected document group S. The collected document group S is a starting point of the collection.

The reference extraction unit 102 extracts the reference from the collected document group S, stores the URL of the referenced document of the collected document group S in the URL table 120, and stores the extracted reference in the reference table 121. In the document collection apparatus according to the second embodiment, the URL table 120 contains a column of a positive sample flag indicating whether or not a document is contained in the positive sample document group PS instead of the community flag. The positive sample flag is set ON (set to 1) when a document is contained in the positive sample document group. When the reference table 121 stores the reference information, it is not necessary to distinguish documents inside a community from those outside the community.

The reference score and co-reference score computation unit 201 computes the reference score and the co-reference score indicating the relationship between the positive sample document group and the negative sample document group and a referenced document of the collected document S based on the reference extracted by the reference extraction unit 102. The next prospect determination unit 104 determines a document which satisfies a predetermined condition as a prospect N to be collected next in the documents which are referenced documents referred to by the collected document group S and are not contained in the positive sample document group PS based on the reference score and the co-reference score computed by the reference score and co-reference score computation unit 201. The next prospect determination unit 104 excludes a document in the prospects N to be collected next and in the negative sample document group from the negative sample document group NS, and adds it to the positive sample document group PS.

The document collection unit 101 refers to the URL table 120, collects an uncollected document in the prospect N to be collected next, and adds it to the positive sample document group PS. The document collection apparatus 200 according to the second embodiment extracts the reference of the collected document S as described above until the number of documents of the positive sample document group PS has reached a predetermined number of documents, determines a prospect N to be collected next based on the reference, and repeats the process of collecting a prospect N to be collected next.

When the number of the collected documents S reaches a predetermined value, the summary unit 106 summarizes the collected document group S based on the referencing expression, and the keyword assignment unit 107 assigns a keyword to the collected document group S based on the frequency, etc. using a referencing expression. The ranking unit 105 computes the significance level of each collected document S based on the reference and the feature of the character string of the URL, and ranks the collected documents S based on the significance level, thereby generating excellent contents 210 for each field. Thus, in the document collection apparatus according to the second embodiment, documents relating to a specified field can be collected without analyzing the contents of the text of the documents, summarized, and assigned a keyword.

The excellent contents 210 for each field is provided for the server 160 through the retrieval engine 140. A client of a server can be provided with a retrieval service using the browser 160.

Described below is the method of the document collection apparatus collecting a document relating to a specified field according to the second embodiment of the present invention. The notation is described first.

LT(B) indicates a set of referenced documents of a document group B.

LT(p) indicates a set of referenced documents of a document p.

LS(d,X)={c∈X|c refers d} indicates a set of documents referring to the document d in the document set X.

LS(A,X)={c∈X|∃d∈A, c refers d} indicates a set of documents in the document set X referring to at least one document in the document set A.

CC(d,A,X)=LS(d,X)∩LS(A,X) indicates a set of documents in the document set X referring to both a document d and at least one document in document set A.

Figure 14:
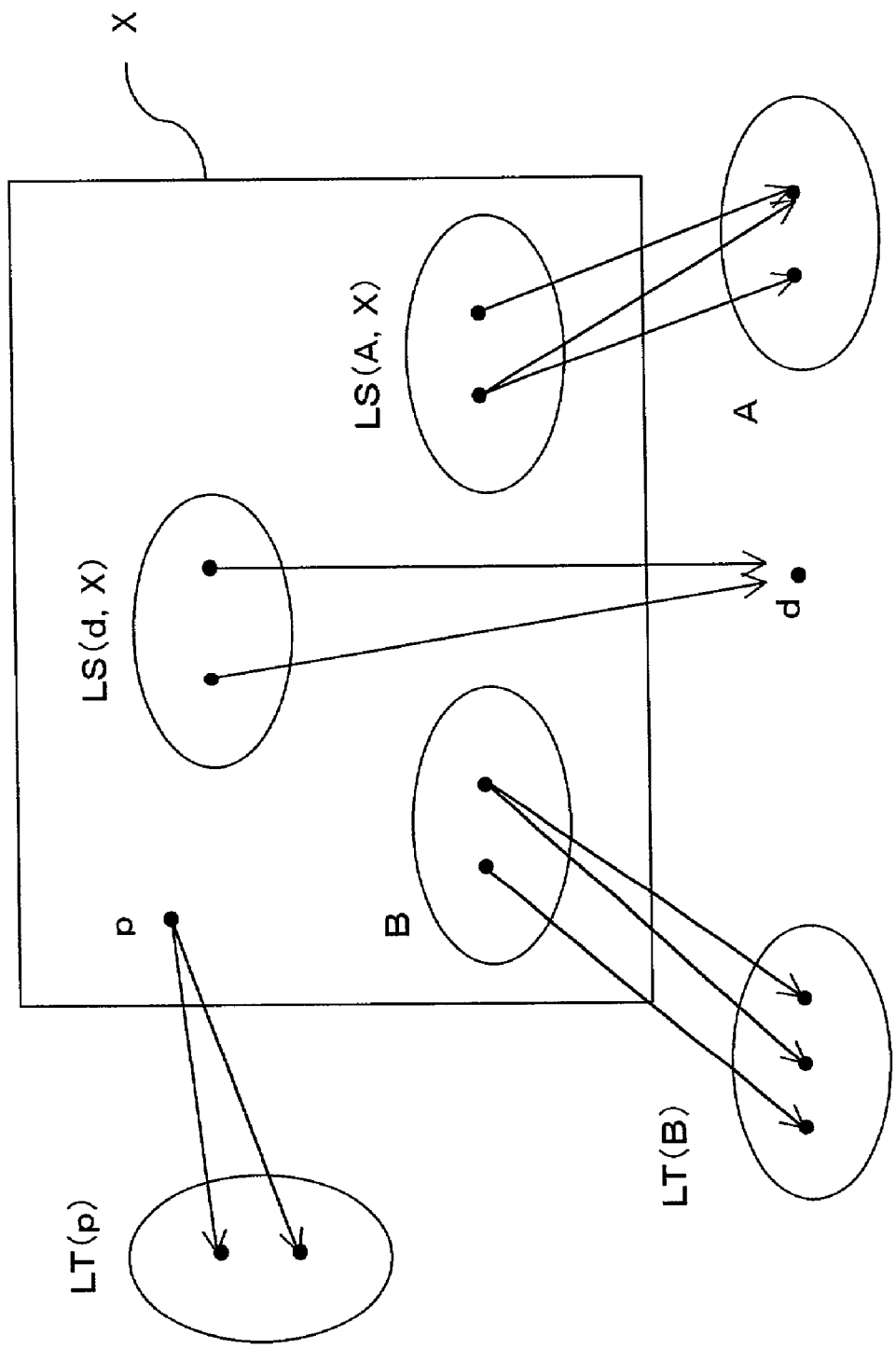
FIG. 14 shows the reference of the documents indicated by LT(S), LT(p), LS(d,X), and LS(A,X)
Figure 15:
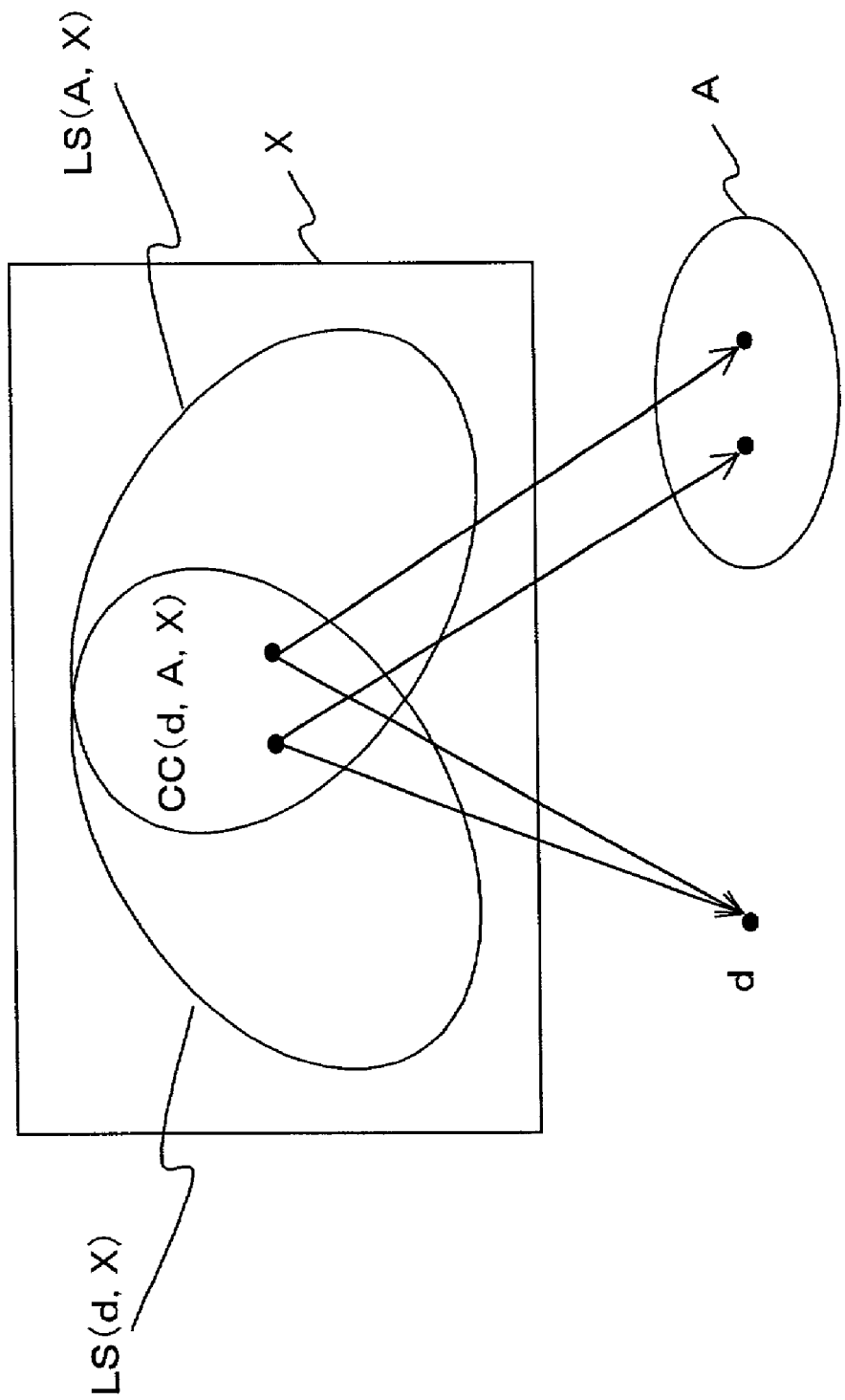
FIG. 15 shows the reference of the documents indicated by CC (d,A,X)

FIG. 14 shows the reference of a document indicated by each set of documents for LT(S), LT(p), LS(d,X), and LS(A,X). In FIG. 14, a black dot indicates a document, an arrow indicates reference, the root of an arrow indicates a referring document, and the point of an arrow indicates a referenced document. As shown in FIG. 14, LT(B) and LS(A,X), and LT(p) and LS(d,X) have arrows in the opposite direction respectively. That is, the referenced document and the referring document are replaced with each other among them. In addition, FIG. 15 shows the reference of documents indicated by CC(d,A,X).

The process of collecting documents in a specified field is described below by referring to FIG. 16. In the document collection apparatus according to the second embodiment of the present invention, when semantically similar documents in a specified field such as 'XML', 'Linux', etc. are collected by priority, the documents can be collected based on the reference without analyzing the contents of the text of the documents.

First, typical documents belonging to the specified field are collected by retrieving them from, for example, an existing retrieval engine and link set, and defined as a positive sample document group PS. Similarly, a document belonging to a field not overlapping the specified field is retrieved, collected, and defined as a negative sample document group NS. The positive sample document group PS and the negative sample document group NS make an initial document group. Then, the URLs of the documents of the PS and the NS, a collection completion flag (all ON (set to 1)), and a positive sample flag (ON (set to 1) when a positive sample document) are stored in the URL table 120. The union PS∪NS of the document group NS is defined as a collected document group S (step S51). Assuming that the specified field is 'computer', an example of a field not overlapping the specified group can be, for example, 'handiwork', 'cooking', 'beauty culture', etc.

The reference extraction unit 102 extracts the reference from the initial collected document group S (initial document group) when the collection is started, and subsequently from a newly collected documents (step S52), stores the URL of a referenced document in the URL table 120, and stores the reference in the reference table 121. This process is the same as the process in the first embodiment of the present invention.

Based on the extracted reference, the reference score and co-reference score computation unit 201 computes the reference score $R_{score}$(d,PS,S) by the following equation (6) on the document d∈T(S) contained in the document set T(S)= TL(S)-PS obtained by excluding the documents contained in the positive sample document group PS from the referenced document of the collected document group S. The ranking unit 105 defines the document group whose reference score $R_{score}$(d,PS,S) is ranked at the top n1 (step S53). Whether or not collected documents are contained in the positive sample document group PS can be determined by referring to the positive sample flag of the URL table 120.

$$R_{score}(d, PS, S) = \log(|LS(d, PS)|) \cdot \frac{|LS(d, PS)|}{|LS(d, S)|} \quad (6)$$

The first term in the equation (6) indicates the logarithm of the number of documents of the positive sample document group referring to the document d. The second term in the equation (6) indicates the ratio of the number of documents of the positive sample document group PS referring to the document d to the number of collected documents referring to the document d. Therefore, the document d referenced more frequently only by the positive sample document group PS in the collected document group S has a larger value of $R_{score}$(d,PS,S).

That is, the ranking unit 105 defines as N1 a document which is more frequently referenced by the positive sample document group PS in a specified field in the referenced documents of newly collected documents, and which is less frequently referenced by the negative sample document group NS having small relationship with the specified field based on the reference score $R_{score}$(d,PS,S). FIG. 17 shows the reference indicated by each set contained in the equation (6) when the reference is computed on the document d.

Then, the reference score and co-reference score computation unit 201 computes the co-reference score $C_{score}$(d,PS, S) by the following equation (7) on the document d∈T(S)-N1. The ranking unit 105 defines as N2 the document group whose co-reference score $C_{score}$(d,PS,S) is ranked at the top n2 in the d∈T(S)-N1 (step S54).

$$C_{score}(d, PS, S) = \log\left(\sum_{p \in CC(d,PS,S)} |LT(p) \cap PS|\right) \cdot \frac{|CC(d, PS, S)|}{|LS(d, S)|} \quad (7)$$

The contents of the logarithm of the first term of the equation (7) indicate the sum of products of the number of documents which are referenced documents of the document p and are contained in the positive sample document group PS for all collected documents p referring to both document d and documents in the positive sample document group PS. Therefore, the co-reference score $C_{score}$(d,PS,S) can be larger for the document having a larger number of collected documents p referring to both document d and documents of the positive sample document group PS, and for the document d having a larger number of documents that are referenced documents referred to by the document p and are in the positive sample document group PS. That is, the co-reference score $C_{score}$(d,PS,S) can be larger for the document d which is referenced by a collected document referring to a document in the positive sample document group PS, and has a larger number of collected documents referring to the document d.

Figure 18:
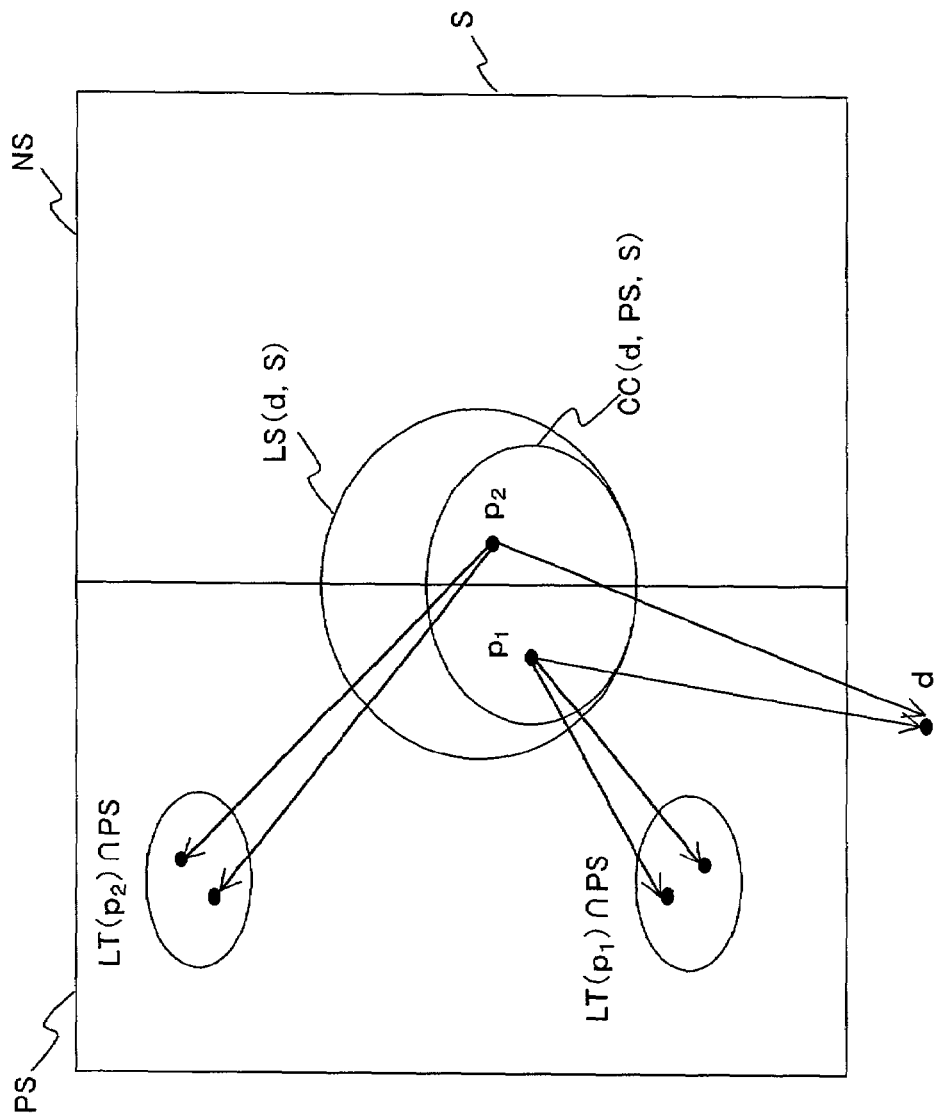
FIG. 18 shows the reference indicated by each union contained in the equation for computing a co-reference score.

The second term of the equation (7) indicates the ratio of the number of documents p referenced with the document d to the number of collected documents which are referring documents of the document d. The co-reference score $C_{score}$(d,PS,S) can be larger when the ratio is higher. FIG. 18 shows the reference indicated by each set in the equation (7) when the co-reference score is computed on the document d.

That is, the co-reference score indicates the ratio of the frequency at which the document d is referenced with the documents of the positive sample document group PS.

The ranking unit 105 determines the prospect N to be collected next=N1∪N2 (step S55) The ranking unit 105 searches the URL table 120 using the URL of the prospect N to be collected next as a key, and sets the positive sample flag of the prospect N to be collected next ON (set to 1). In this process, a document contained in the negative sample document group NS and determined as a prospect to be collected next is removed from the negative sample document group NS, and added to the positive sample document group PS (step S56).

The document collection unit 101 collects uncollected documents in the prospects N to be collected next from the network based on the URL stored in the URL table 120, and sets on (sets to 1) the collection completion flag corresponding to the collected document group (step S57). In this process, the newly collected documents are added to the positive sample document group PS. The document collection unit 101 refers to the URL table 120, and determines whether or not the number of documents of the positive sample document group SP is equal to or larger than a predetermined value (step S58). When the number of documents of the positive sample document group PS is smaller than the predetermined value (NO in step S58), control is returned to step S52, and the process is repeated.

When the number of the positive sample document group PS is equal to or larger than a predetermined value (YES in step S58), the documents of the positive sample document group PS are selected (step S59), and the process terminates. Since the document selecting process is similar to the process according to the first embodiment, the explanation is omitted here.

Thus, according to the present embodiment, a document in a specified field can be quickly collected with high precision without analyzing the contents of the text of the document.

Described below is an example of a variation of the second embodiment. Since it is difficult to collect the documents of the negative sample document group NS, it is desired to effectively use them without discarding them after the collecting process. In the document collection apparatus according to an example of a variation of the second embodiment, the negative sample document group NS collected in the above mentioned process is effectively used. Thus, it is possible to collect in parallel a plurality of independent documents such as 'Java language', 'needlework', 'French food', etc. Therefore, when documents in a specified field are collected, the document group in the specified field is defined as a positive sample document group, and the document group in the other fields is defined as a negative sample document group NS.

Figure 19:
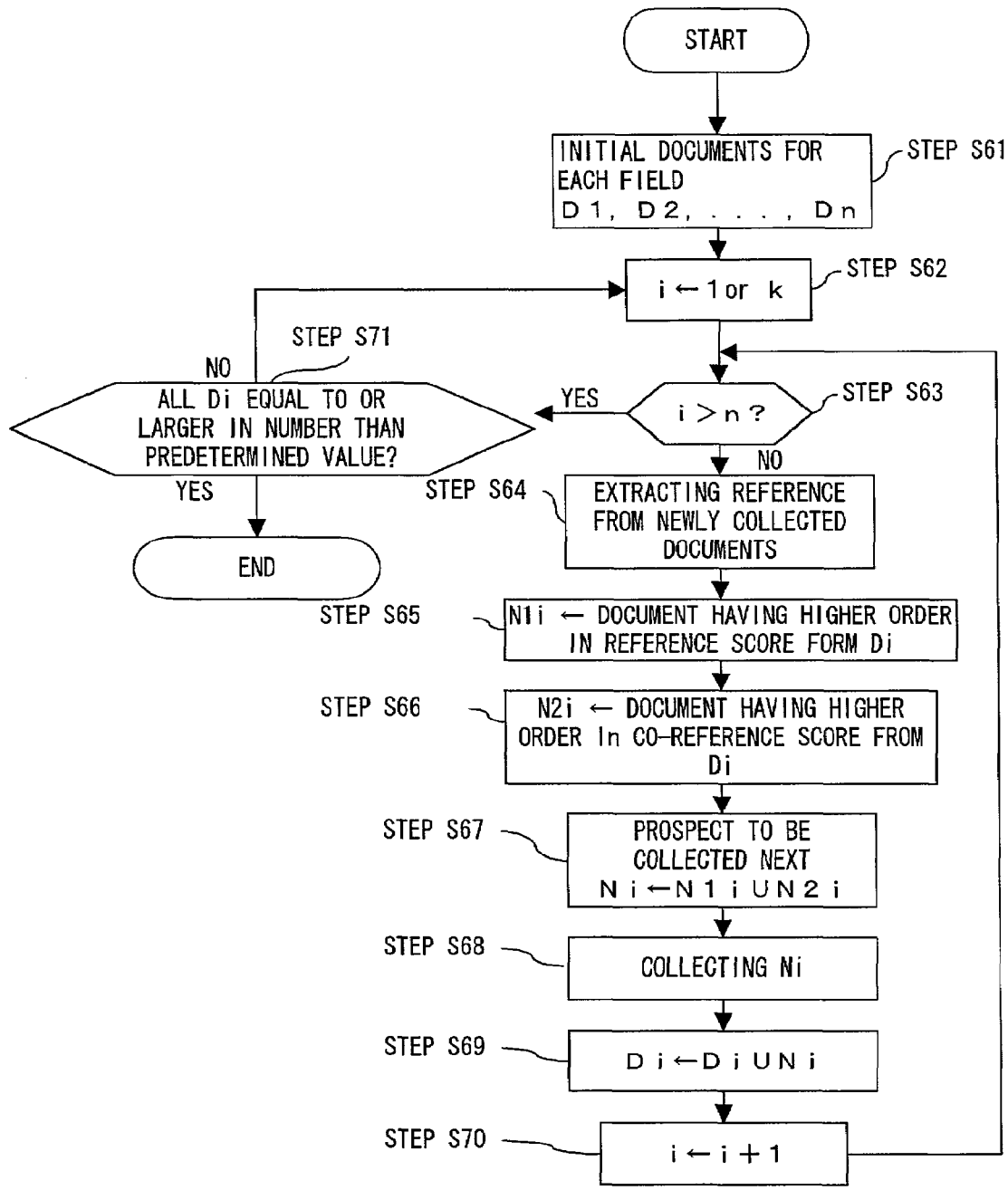
FIG. 19 is a flowchart of the process performed by the document collection apparatus relating to a variation according to the second embodiment of the present invention.

Since the configuration of the document collection apparatus is described above by referring to FIG. 13, the detailed explanation is omitted here. The process performed by the document collection apparatus according to an example of a variation of the second embodiment is described below by referring to FIG. 19.

First, a document group Di (i=1, 2, . . . , n) of n independent fields is retrieved and collected using a retrieval engine, a link set, etc. The URLs of the documents of the document group Di, the collection completion flag, and the field identification information which is the information identifying each field are stored in the URL table 120. In the document collection apparatus according to an example of a variation of the document collection apparatus according to the second embodiment, a positive sample flag is not required because the field identification information is used. The document group Di is an initial document group of the field i. The collected document group is set as D=(D1, D2, . . . , Dn) (step S61).

First, the reference extraction unit 102 provides i (step S62). When the collection starts, the reference extraction unit 102 sets i to 1. Then, the reference extraction unit 102 determines whether or not i exceeds n (step S63). If i exceeds n (YES in step S63), then control is passed to step S71. Otherwise (NO in step S63), the reference extraction unit 102 extracts the reference from the newly collected documents in the document group Di corresponding to the field i (from the initial document group when the collection is started), and stores the URL of the referenced document in the URL table 120, and the reference in the reference table 121 (step S64). This process is the same as that according to the first embodiment of the present invention.

The reference score and co-reference score computation unit 201 sets the referenced document of the document group Di which is not contained in the collected document group D, and is the document group T(Di)=LT(Di)-D as a next collection range, and computes the reference score $R_{score}(d,Di,D)$ by the above mentioned equation (6) on the document d∈T(Di) contained in the next collection range T(Di). The next prospect determination unit 105 defines as N1i the document group whose reference score $R_{score}(d,Di,D)$ is ranked as the top n1 (step S65). The field containing collected documents can be determined by referring to the field identification information of the URL table 120.

The reference score and co-reference score computation unit 201 computes the co-reference score $C_{score}(d,Di,D)$ by the above mentioned equation (7) on the document d∈T(Di)-N1i contained in the set obtained by excluding N1i from the next collection range T(Di). The next prospect determination unit 105 defines as N2i a document group whose co-reference score $C_{score}(d,Di,D)$ is ranked at the top n2 (step S66).

The next prospect determination unit 105 defines N1i∪N2i as the prospect Ni to be collected next in the field i (step S67). The next prospect determination unit 105 accesses the URL table 120, and adds the category identification information corresponding to the current value i to the prospect Ni to be collected next. The document collection unit 101 collects the prospect Ni to be collected next from the network (step S68). The document collection unit 101 accesses the URL table 120, and sets on (sets to 1) the collection completion flag of the collected prospect Ni to be collected next (newly collected documents). Thus, the document collection unit 101 adds the newly collected documents to the document group Di, and defines the obtained group as a new document group Di (step S69).

Then, the reference extraction unit 102 increments i by 1 (step S70), and control is returned to step S63 The document collection apparatus 200 repeats the process until i exceeds n.

When i exceeds n (YES in step S63), the reference extraction unit 102 refers to the URL table 120, counts the number of documents of each document group Di according to the collection completion flag and the field identification information, and determines whether or not the number of documents of each document group Di is equal to or larger than a predetermined value (step S71). When there is a document group Dk (k indicates any number from 1 through n) whose number of documents is smaller than a predetermined value, control is returned to step S62, and the reference extraction unit 102 repeats the processes in and after step S63 by setting i=k.

When there are a plurality of document groups Dk whose number of documents is smaller than a predetermined value, for example, Dk1, Dk2, and Dk3, the processes in and after step S63 are repeated if i=k1, k2, and k3. When all collected document groups Di from D1 through Dn have the number of documents equal to or larger than a predetermined value (YES in step S71), the process terminates.

Thus, when a document in a field is collected, the document group in the field is defined as a positive sample document group PS, and the union of the document group in the other fields is used as a negative sample document group NS. Therefore, the process on the negative sample document group NS is not wasted.

In addition, according to an example of a variation of the second embodiment, when a document group Di in a field is defined as a positive sample document group PS, and documents in the field are to be collected, the document group in the other fields used as a negative sample document group NS is larger than the positive sample document group PS. Furthermore, since the negative sample document group NS itself is a document group in the other fields, the documents in the negative sample document groups NS are semantically similar to one another.

If the collection proceeds to some extent according to the second embodiment (not in an example of a variation), the positive sample document group PS becomes larger while documents are transferred from the negative sample document group NS to the positive sample document group PS. As a result, for example, the second term of the reference score $R_{score}(d,PS,S)$ shown in the equation (6) becomes larger. Thus, there is the possibility that the collection precision is lowered, which can be successfully improved by an example of a variation of the embodiment.

Figure 20:
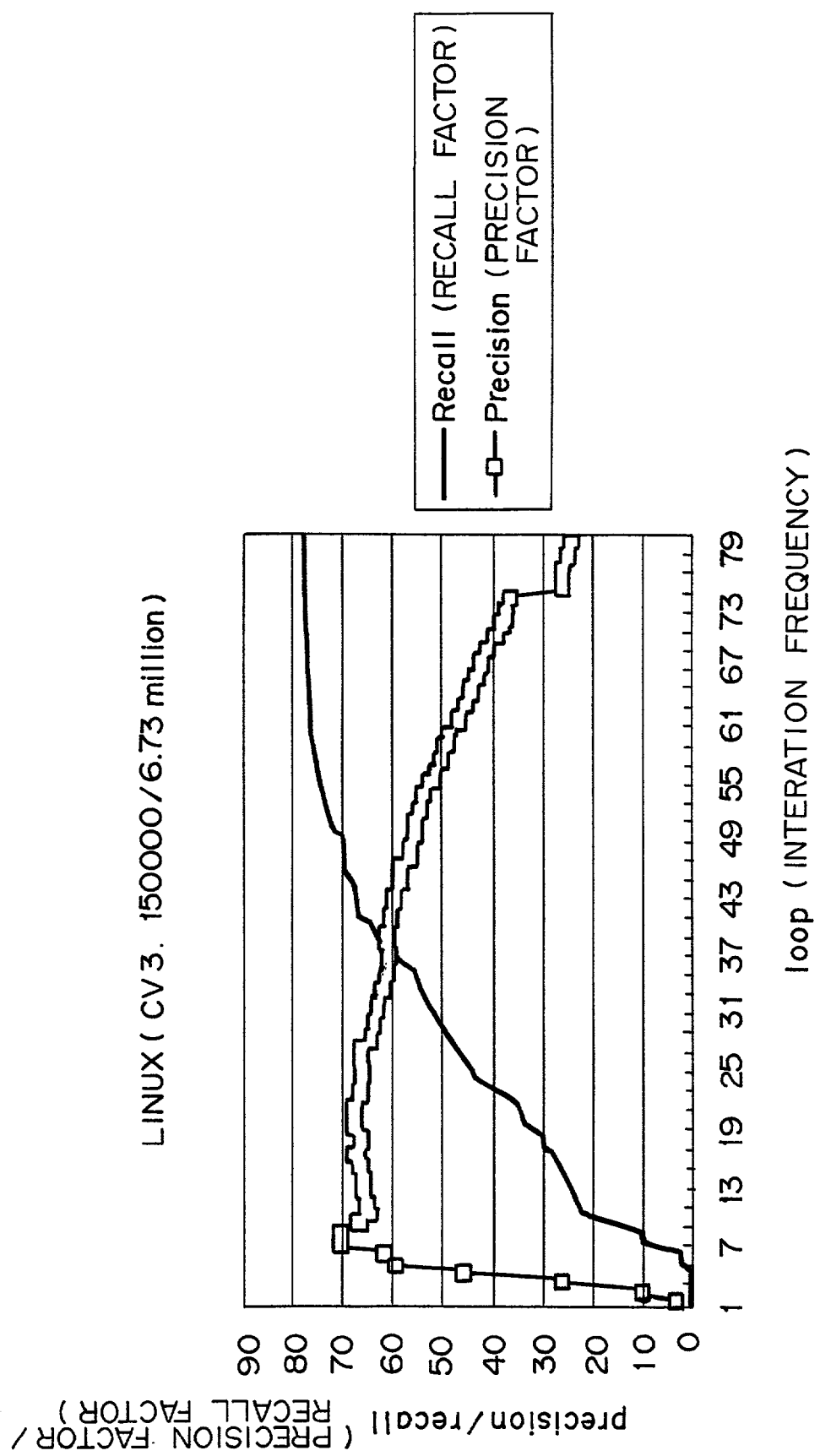
FIG. 20 shows a result (1) of the experiment of the collection precision of the document collection apparatus.

The precision of the collection of documents in a specified field through the document collection apparatus according to the second embodiment is described below by referring to FIGS. 20 and 21. FIG. 20 shows the result of the experiment of the collection precision of the document collection apparatus assuming that the documents of about 6.7 million URLs collected from the network, the documents of 15,000 URSs containing 'Linux' are correct samples L, optionally selected documents of about 5,000 URLs are initial documents of the positive sample document group PS, and the other documents (D-PS) are the initial documents of the negative sample document group NS.

In FIG. 20, the horizontal axis shows the collection frequency i, and the vertical axis shows the precision factor or the recall factor. The recall factor is expressed by a line graph, and the precision factor is expressed by a square plot. The precision factor and the recall factor of the positive sample set PSi obtained in the i-th iteration are expressed by the following equations (8) and (9).

$$\text{Precision factor} = |PSi \cap L|/|PSi| \quad (8)$$

$$\text{Recall rector} = |PSi \cap L|/|L| \quad (9)$$

That is, the precision factor indicates the rate of correct samples L in the positive sample document group S in the positive sample sets Si, and indicates the number of documents (that is, unrelated documents) not contained in the target field. The recall factor indicates the rate of correct samples L in the positive sample document group Is in the correct samples L, and indicates the number of documents not collected (missed) although contained in the target field.

As shown in FIG. 20, when the frequency of the iteration is about 73, the recall factor suddenly lowered. However, the frequency of the iteration is 10 or more, the precision factor and the recall factor are acceptable. The reason for a lowered recall factor at the frequency of the iteration of about 73 is considered to be the unrelated documents collected based on the reference extracted from the group of unrelated documents.

FIG. 21 shows a result of a similar experiment in which 14,000 URLs containing 'What's New' are correct samples L. As shown in FIG. 21, when the frequency of the iteration is lower, the precision factor becomes lower to a small value. This is because the contents such as 'What's New' have the smallest semantic relations with one another.

Based on the experiment result shown in FIG. 20 and 21, semantically related document groups can be efficiently collected.

Each server and each terminal described above can be configured by the information processing device as shown in FIG. 22. A computer 300 comprises a CPU 301, memory 302, an input device 303, an output device 304, an external storage device 305, a medium drive device 306, and a network connection device 307. These units are interconnected through a bus 308.

The memory 302 contains, for example, ROM (Read Only Memory), RAM (Random Access Memory), etc., and stores a program and data used in a process. The CPU 301 performs a necessary process by executing a program using the memory 302.

Each unit forming part of the above mentioned server and terminal is stored as a program in a specific program code segment of the memory 302. The input device 303 can be, for example, a keyword, a pointing device, a touch panel, etc. and is used in inputting an instruction from a user and information. The output device 304 can be, for example, a display, a printer, etc., and is used in issuing an inquiry to a user of the computer 300, and outputting a process result, etc.

The external storage device 305 can be, for example, a magnetic disk device, an optical disk device, a magneto-optical disk device, etc. The external storage device 305 stores the above mentioned program and data to load them into the memory 302 for use as necessary.

The medium drive device 306 drives the portable recording medium 309 and accesses the recorded contents. The portable recording medium 309 can be any computer-readable recording medium such as a memory card, a memory stick, a floppy disk, CD-ROM (Compact Disc Read Only Memory), an optical disk, a magneto-optical disk, a DVD (Digital Versatile Disk), etc. The portable recording medium 309 can store the above mentioned program and data to load them into the memory 302 as necessary.

The network connection device 307 communicates with an external device through any network (line) such as a LAN, a WAN, etc. to convert data for communications. Furthermore, as necessary, the above mentioned program and data are received from the external device, loaded into the memory 302 for use.

Figure 23:
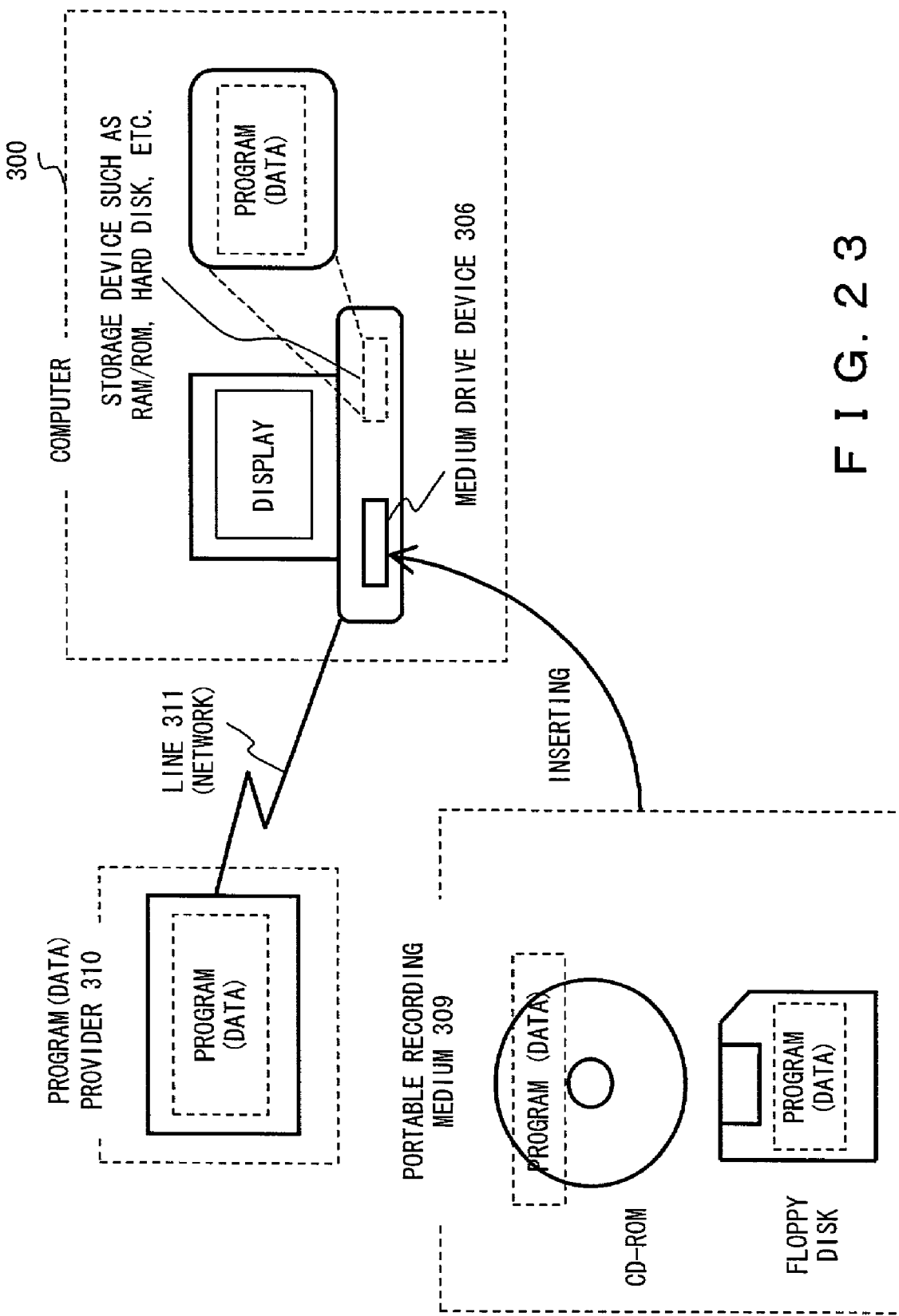
FIG. 23 shows the recording medium, a transmission signal, and a transmission medium for providing a program and data for the information processing device.

FIG. 23 shows a computer-readable recording medium and a transmission signal capable of providing a program and data for the computer 300 shown in FIG. 22.

The present invention can also be configured as the portable recording medium 309 for allowing the information processing device to perform the functions similar to those realized by each configuration of the embodiment of the present invention.

A program used to direct a computer to perform the processes performed by each device according to the present embodiment is stored in the computer-readable portable recording medium 309 in advance, the computer 300 reads the program from the portable recording medium 309 as shown in FIG. 23, the read program is temporarily stored in the memory 302 of the computer 300 or the external storage device 305, and the CPU 301 in the computer 300 reads and executes the stored program.

When a program is downloaded from the a program (data) provider 310 to the computer 300, the transmission signal transmitted through a line (network) 311 (transmission medium) can be processed by a general purpose computer corresponding to each device described in the above mentioned embodiment of the present invention.

The embodiments of the present invention have been described above in detail, but the present invention is not limited to the above mentioned embodiment, and can be variable applications can be realized.

For example, by combining the document collection apparatus 100 according to the first embodiment with the document collection apparatus 200 according to the second embodiment, a document can be collected for each field for community use.

Furthermore, each unit forming part of the document collection apparatus 100 or 200 and each DB can realize a series of business processes through cooperation. These unit and DB can be provided in the same server, or in different servers to cooperatively operate through a network.

As described above in detail, the present invention can determine a document to be collected based on the reference between documents when a document for a specified purpose is to be collected, and the determined documents can be collected, thereby quickly selecting and collecting a document for a specified purpose independent of a language.

Furthermore, based on a referencing expression, collected documents are summarized, and a keyword is assigned to each collected document, thereby easily accessing the collected document. Additionally, since the contents of the text of the document are not analyzed, a keyword can be promptly assigned independent of the language.

While the invention has been described with reference to the preferred embodiments thereof, various modifications and changes may be made to those skilled in the art without departing from the true spirit and scope of the invention as defined by the claims thereof.

What is claimed is:

1. A method for collecting documents linked to each other from a network by crawling the network, comprising:
   collecting a number of documents into a collected document group until the number of documents is equal to or larger than a predetermined value, the documents being collected from inside a community through the network based on a reference of each document in the collected document group, the reference defining a relationship between referring documents and referenced documents inside or outside the community which are linked to the referring documents;
   collecting a newly collected document group from inside and outside the community based on the reference of the collected document group from inside the community; and
   indicating a level of significance of a collected document belonging to the newly collected document group according to references to the collected document and information about a position of the collected document in the network, with the significance of the collected document increasing with an increased number of references to the collected document from the referring documents thereof at network locations having low similarity to the position of the collected document in the network.

2. The method according to claim 1, further comprising:
   determining new documents to be collected based on the references from and the significance level of the collected document.

3. The method according to claim 2, wherein the new documents are determined separately for inside the community and for outside the community.

4. The method according to claim 3, further comprising:
   presenting a result of retrieving the new documents separately for inside the community and outside the community.

5. The method according to claim 2, further comprising:
   determining whether any of the documents is in the community according to information indicating the position of the document in the network.

6. A method for collecting documents linked to each other from a network by crawling the network, comprising:
   providing a positive sample document group relating to a field, and a negative sample document group related to the field;
   determining a prospective document for collection that is related to the field based on a reference relation to the positive sample document group and the negative sample document group by computing a reference score indicating a level at which the prospective document is referenced only by at least one document in the positive sample document group based on the reference relation which defines a relationship between original documents and linked documents belonging to the positive sample document group or to the negative sample document group which are linked to the original documents;
   collecting the prospective document having a high reference score; and
   indicating a level of significance of the prospective document according to references to the prospective document and information about a location of the prospective document in the network, with the significance of the prospective document increasing with an increased number of references to the prospective document from referring documents at network locations having low similarity to the location of the prospective document in the network.

7. A method for collecting documents linked to each other from a network by crawling the network, comprising:
   providing a positive sample document group relating to a field, and a negative sample document group less related to the field;
   determining a prospective document for collection that is related to the field based on a reference relation to the positive sample document group and the negative sample document group by computing a co-reference score indicating a level at which the prospective document is referenced together with a first collected document in the positive sample document group for a second collected document referenced by a third collected document referring to a fourth collected document in the positive sample document group based on the reference relation which defines a relationship between original documents and linked documents belonging to the positive sample document group or to the negative sample document group which are linked to the original documents;

collecting the prospective document having a high co-reference score; and indicating a level of significance of the prospective document according to references to the prospective document and information about a location of the prospective document in the network, with the significance of the prospective document increasing with an increased number of references to the prospective document from referring documents at network locations having low similarity to the location of the prospective document in the network.

8. The method according to claim 1, further comprising:
summarizing the collected documents based on a referencing expression used in the collected documents.

9. The method according to claim 1, further comprising:
assigning a keyword to the collected documents based on a referencing expression used in the collected documents.

10. The method according to claim 1, further comprising:
not assigning a keyword based on the referring expression when the referencing expression is used regardless of a content of a referenced document.

11. The method according to claim 9, further comprising:
counting a number of different documents referenced using the referencing expression; and
not assigning the keyword based on the referencing expression when the number of different documents is equal to or larger than a predetermined value.

12. The method according to claim 9, further comprising:
counting a reference frequency at which each collected document is referenced by the referencing expression when the number of different documents is smaller than a predetermined value; and
determining whether or not the referencing expression is assigned as the keyword based on the number of different documents and the reference frequency.

13. The method according to claim 9, further comprising:
combining the keyword based on the referencing expression with a keyword extracted from text of the collected document, and a keyword extracted from information indicating a position in the network about the collected document.

14. A method for retrieving documents from a terminal belonging to a community in a network, comprising:
transmitting information for retrieval of the documents to a server; and
receiving the documents retrieved separately from inside and outside the community according to the information for retrieval together with information indicating a significance level for the community, the significance level indicating an importance of a document based on information about references in a collected document group, and information indicating a position of the document, with the significance level of the document increasing with an increased number of references to the document from referring documents at network locations having low similarity to the position of the document in the network.

15. A document collection apparatus collecting documents linked to each other from a network by crawling the network, comprising:
a next prospect determination unit determining a prospect to be collected next based on a reference relation of a collected document, the reference relation defining a relationship between original documents and other documents inside or outside the community which are linked to the original documents;

a community determination unit determining whether or not the prospect is in a community in the network according to information indicating a position in the network of the prospect; and a document collection unit collecting the prospect and other prospects from inside and outside the community after collecting documents larger in number than a predetermined value from inside the community, and computing a level of significance of the prospect according to references to the prospect and the information about the position of the prospect in the network, with the significance of the prospect increasing with an increased number of the references to the prospect from referring documents at network locations having low similarity to the position of the prospect in the network.

16. A document collection apparatus collecting documents linked to each other from a network by crawling the network, comprising:
a next prospect determination unit determining a prospect to be collected next based on a reference relation between a positive sample document group which is a document group related to a field and a negative sample document group which is a document group less related to the field; and a document collection unit collecting the prospect from the network; wherein the reference relation is a relationship between original documents and other documents belonging to the positive sample document group or to the negative sample document group which are linked to the original documents, and computing a level of significance of the prospect according to references to the prospect and information about a position of the prospect in the network, with the significance of the prospect increasing with an increased number of the references to the prospect from referring documents at network locations having low similarity to the position of the prospect in the network.

17. A computer-readable recording medium recording a program used to direct a computer to control collection of documents linked to each other from a network by crawling the network, comprising:
collecting a number of documents into a collected document group until the number of documents is equal to or larger than a predetermined value, the documents being collected from a community through the network based on a reference of each document in the collected document group, the reference defining a relationship between referring documents and referenced documents inside or outside the community which are linked to the referring documents;

collecting a newly collected document group from inside and outside the community based on the reference of the collected document group from inside the community; and indicating a level of significance of a collected document belonging to the newly collected document group according to references to the collected document and information about a position of the collected document in the network, with the significance of the collected document increasing with an increased number of references to the collected document from the referring documents thereof at network locations having low similarity to the position of the collected document in the network.

18. A computer-readable recording medium recording a program used to direct a computer to control collection of documents linked to each other from a network by crawling the network, comprising:

providing a positive sample document group which is a document group relating to a field, and a negative sample document group which is a document group less related to the field;

determining a document to be collected relating to the field based on a reference relation to the positive sample document group and the negative sample document group, the reference relation defining a relationship between original documents and other documents inside or outside the community which are linked to the original documents;

collecting the document to be collected from the network; and indicating a level of significance of the document according to references to the document and information about a location of the document in the network, with the significance of the document increasing with an increased number of references to the document from referring documents at network locations having low similarity to the location of the document in the network.

19. A method for collecting documents linked to each other from a network by crawling the network, comprising:

collecting a number of documents into a collected document group until the number of documents is equal to or larger than a predetermined value, the documents being collected from inside a community through the network based on references in the documents in the collected document group, each reference defining a relationship between a referring document and a referenced document, inside or outside the community, which is linked to the referring document;

collecting a newly collected document group from inside and outside the community based on the reference of the collected document group from inside the community; and indicating a level of significance of a collected document belonging to the newly collected document group according to references to the collected document and information about a position of the collected document in the network, with the significance of the collected document increasing with an increased number of references to the collected document from referring documents at network locations having low similarity to the position of the collected document in the network.

20. The method according to claim 1, wherein a significance of a document referenced by a URL having high similarity is assumed to be low, a document referenced by a larger number of documents are more significant, and a document referenced by a significant document having a low similarity of URL is significant, and a similarity of a URL is defined according to character information about the URL such that a similarity can be a lowest when a document has different server address, path, and file name and such that a similarity of a document in a mirror site or a same server can be high.

* * * * *